(12) United States Patent
Bjersten et al.

(10) Patent No.: US 10,293,886 B2
(45) Date of Patent: May 21, 2019

(54) WATERCRAFT VESSEL WITH A PLANING HULL

(71) Applicant: Petestep AB, Stockholm (SE)

(72) Inventors: Peter Bjersten, Lidingö (SE); Jonas Danielsson, Stockholm (SE)

(73) Assignee: Petestep AB, Stockholm (SE)

( * ) Notice: Subject to any disclaimer, the term of this patent is extended or adjusted under 35 U.S.C. 154(b) by 0 days.

(21) Appl. No.: 14/897,364

(22) PCT Filed: Apr. 29, 2014

(86) PCT No.: PCT/SE2014/050526
§ 371 (c)(1),
(2) Date: Dec. 10, 2015

(87) PCT Pub. No.: WO2014/200407
PCT Pub. Date: Dec. 18, 2014

(65) Prior Publication Data
US 2016/0129970 A1 May 12, 2016

(30) Foreign Application Priority Data
Jun. 11, 2013 (SE) ...................................... 1350711

(51) Int. Cl.
*B63B 1/18* (2006.01)
*B63B 1/16* (2006.01)
*B63B 1/04* (2006.01)

(52) U.S. Cl.
CPC ................ *B63B 1/18* (2013.01); *B63B 1/042* (2013.01)

(58) Field of Classification Search
CPC .. B63B 1/18; B63B 1/042; B63B 1/04; B63B 2001/201

(Continued)

(56) References Cited

U.S. PATENT DOCUMENTS

| 1,050,517 A | 1/1913 | Chase |
| 3,216,389 A | 11/1965 | Thorsen |
| 3,802,370 A | 4/1974 | Collier |
| 4,091,761 A | 5/1978 | Fehn |

(Continued)

FOREIGN PATENT DOCUMENTS

| EP | 0341359 A1 | 11/1989 |
| EP | 0585698 A1 | 3/1994 |

(Continued)

OTHER PUBLICATIONS

Herbert Wagner, "National Advisory Committee for Aeronautics," Apr. 6, 1948; Translation Jahrbuch der Schiffbautechnik,: vol. 34, 1933, p. 1-36, No. 1139.

(Continued)

*Primary Examiner* — Anthony D Wiest
(74) *Attorney, Agent, or Firm* — Banner & Wircoff, Ltd.

(57) ABSTRACT

A watercraft vessel with at least one planing hull, in the form of a single unitary hull or with two or more interconnected hulls, each hull having at its bottom portion a deadrise angle in the interval 5°-70° and provided with at least one water-deflecting surface which extends rearwardly and outwardly in relation to a keel region and which is oriented and configured so as to create a lifting force, and also a forward thrust on the hull. The forward thrust is caused by a lateral spray water stream, which is redirected rearwardly by the water-deflecting surface. The latter should be located laterally outwardly of but adjacent to an approximately triangular bottom part which is submerged at the planing speed. The hull will also provide a smoother ride than conventional, planing hulls, especially in heavy sea.

6 Claims, 21 Drawing Sheets

(58) Field of Classification Search
USPC ................................. 114/271, 288, 290, 291
See application file for complete search history.

(56) References Cited

U.S. PATENT DOCUMENTS

| | | | |
|---|---|---|---|
| 4,231,314 A | 11/1980 | Peters | |
| 4,233,920 A * | 11/1980 | Wood | B63B 1/18 |
| | | | 114/290 |
| 4,584,959 A | 4/1986 | Allison | |
| 4,708,085 A | 11/1987 | Blee | |
| 4,722,294 A * | 2/1988 | Bruning | B63B 1/18 |
| | | | 114/290 |
| 5,031,556 A | 7/1991 | Blee | |
| 5,685,253 A | 11/1997 | Alexander, Jr. | |
| 5,934,218 A | 8/1999 | Chen | |
| 6,666,160 B1 * | 12/2003 | Orneblad | B63B 1/20 |
| | | | 114/271 |

FOREIGN PATENT DOCUMENTS

| | | |
|---|---|---|
| EP | 1685020 B1 | 8/2006 |
| FR | 2522556 A1 | 9/1983 |
| JP | 06298160 A | 10/1994 |
| SE | 405584 B | 12/1978 |
| SE | 465077 B | 7/1991 |

OTHER PUBLICATIONS

Daniel Savitsy et al., "On the Main Spray Generated by Planing Surfaces" published Jan. 1958 by the Institute of the Aeronautical Sciences, Report No. 678.

Daniel Savitsky et al.,"Incluision of Whisker Spray Drag in Performance Prediction Method for High-Speed Planing Hulls," Marine Technology, vol. 44, No. 1, Jan. 2007, pp. 35-56.

* cited by examiner

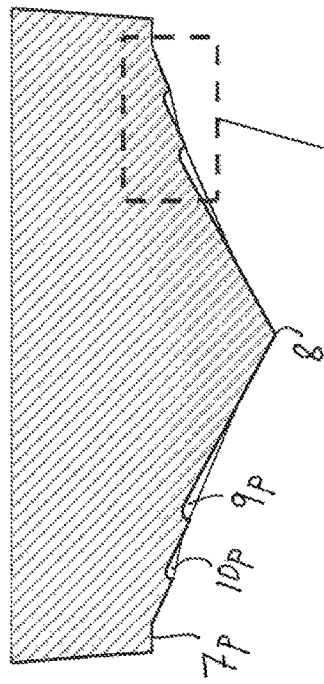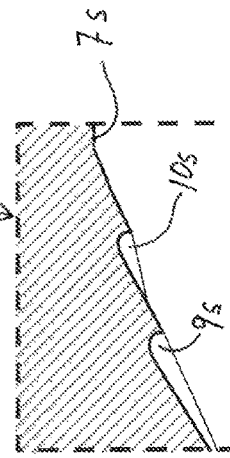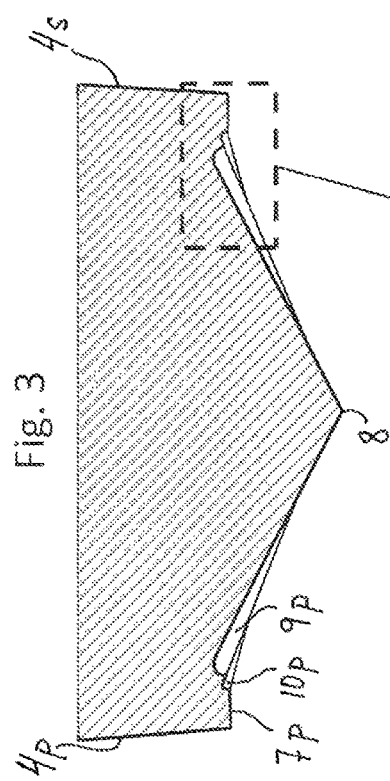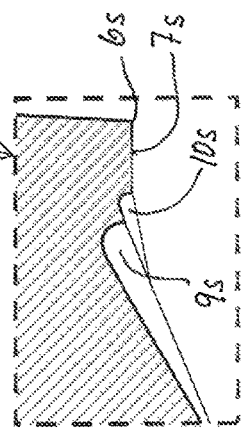

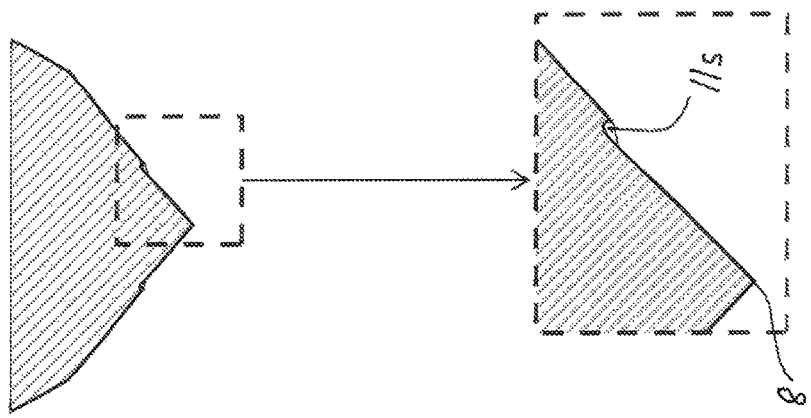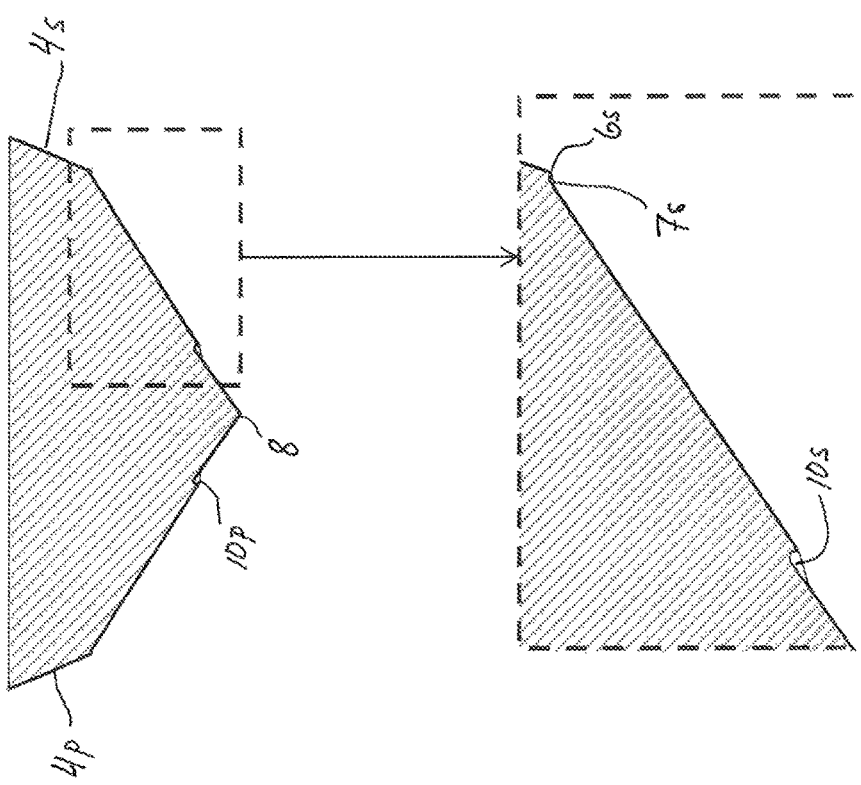

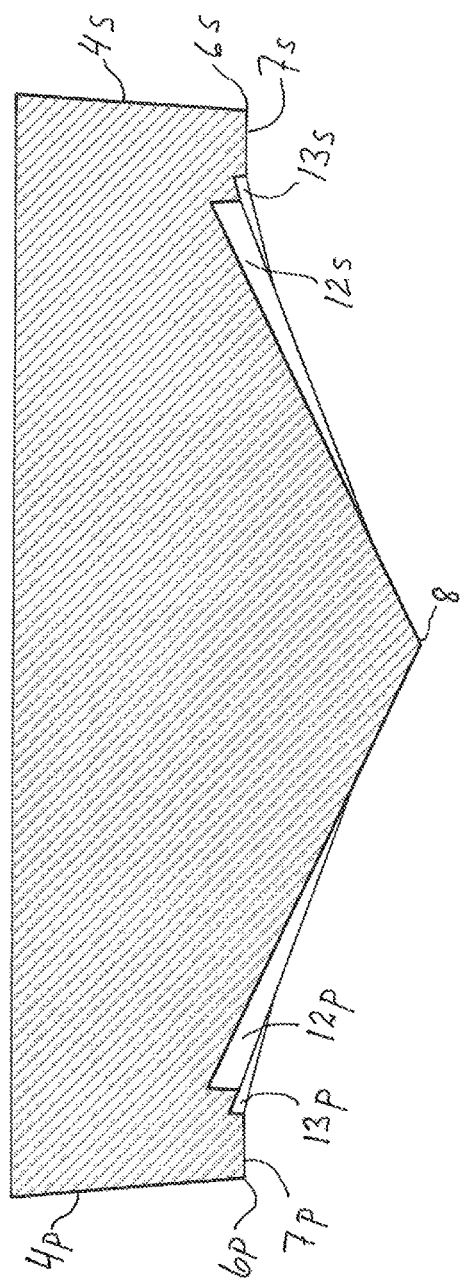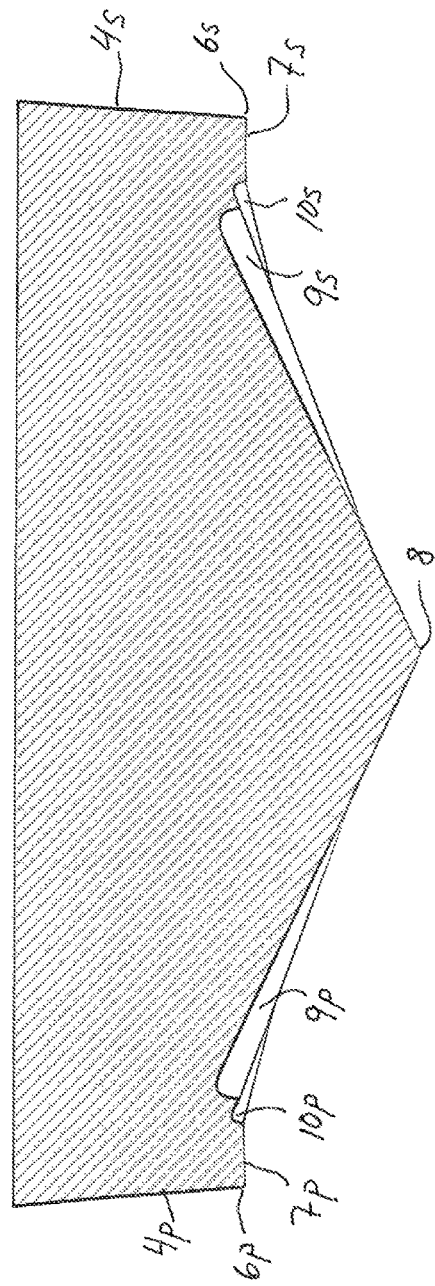

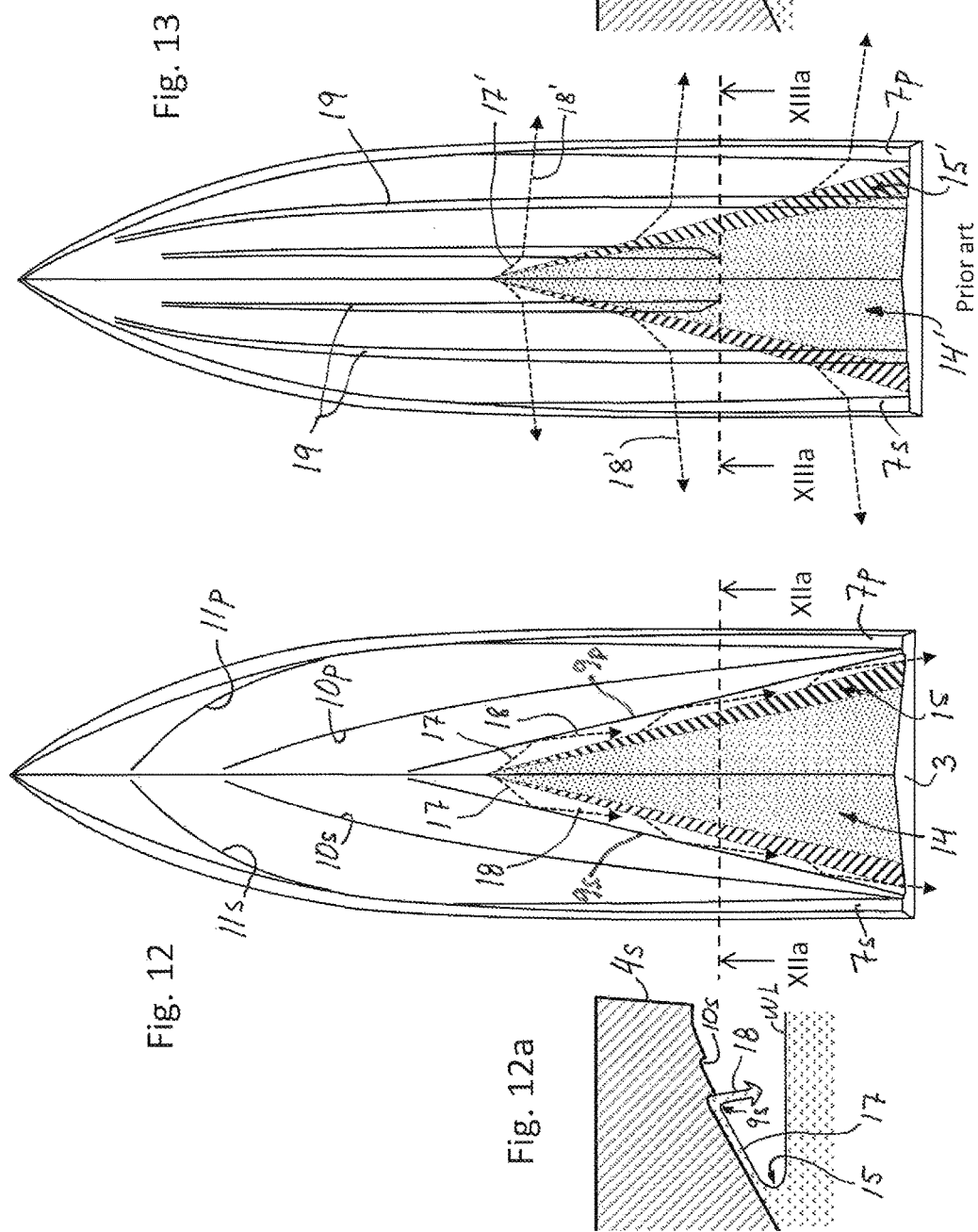

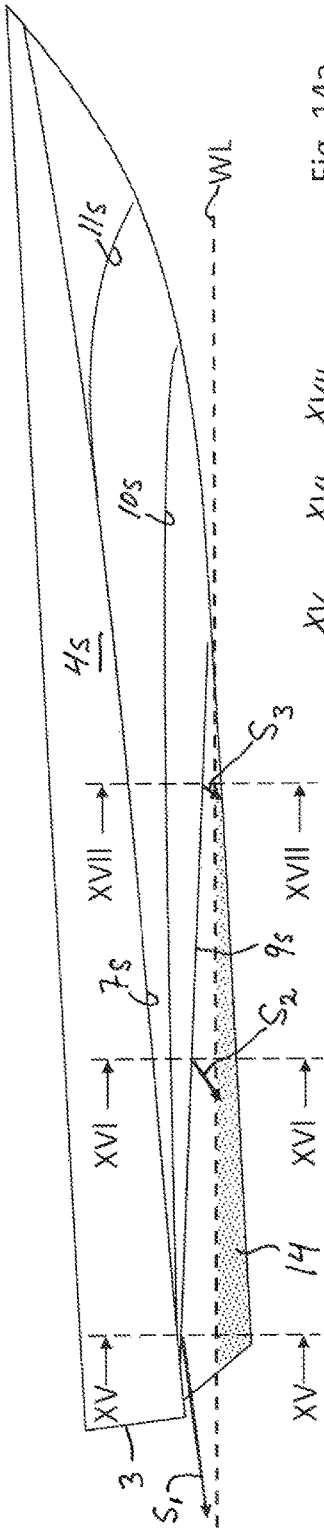
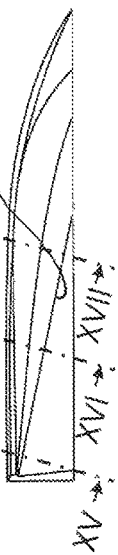
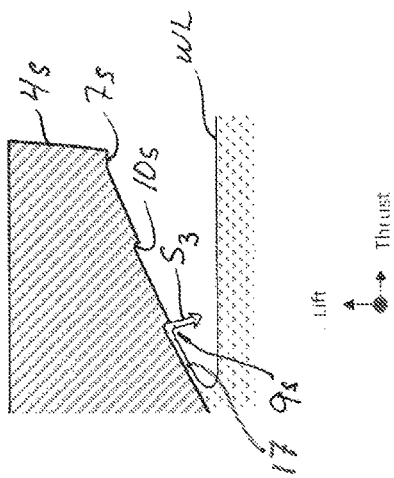
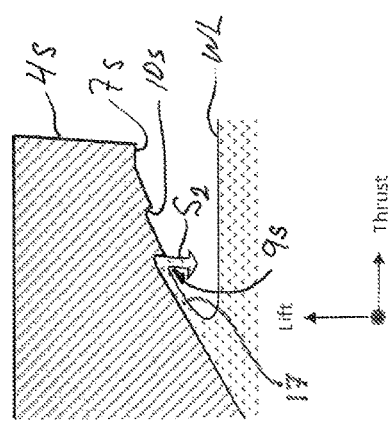
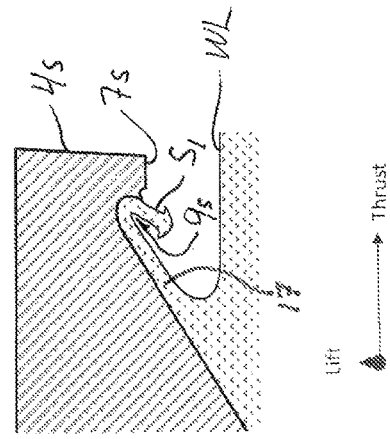

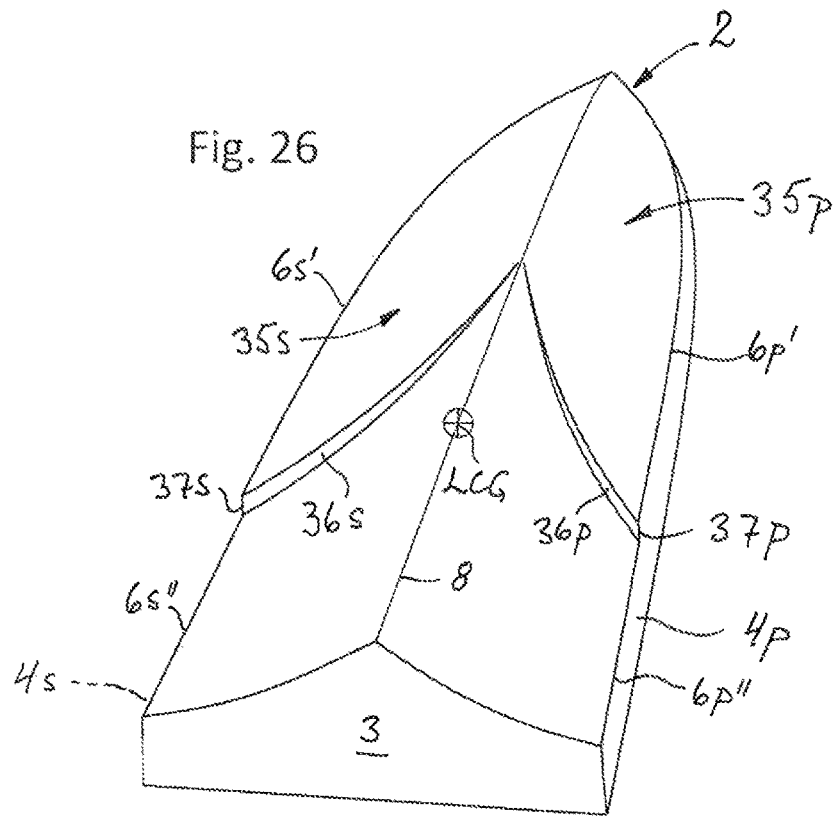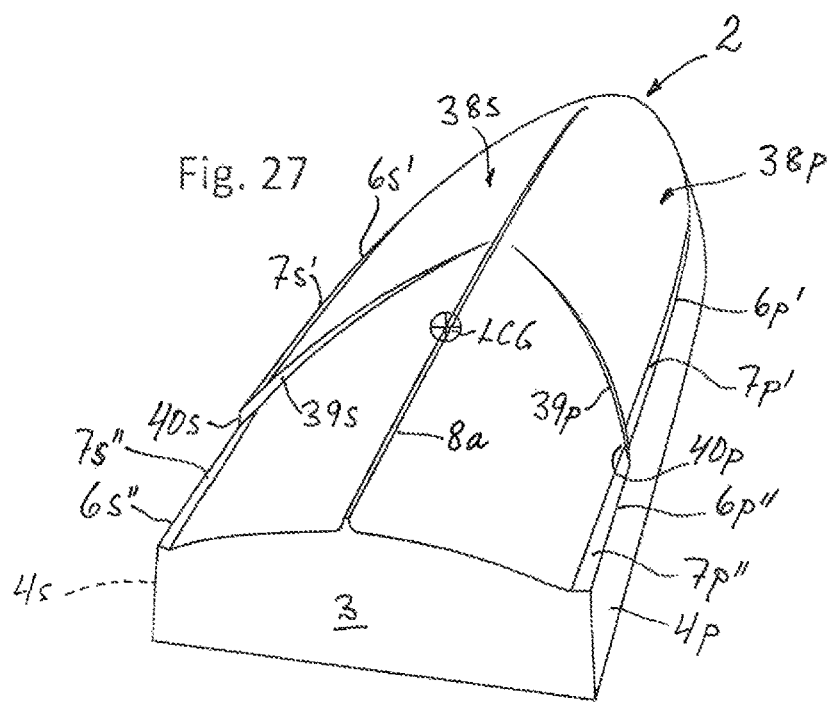

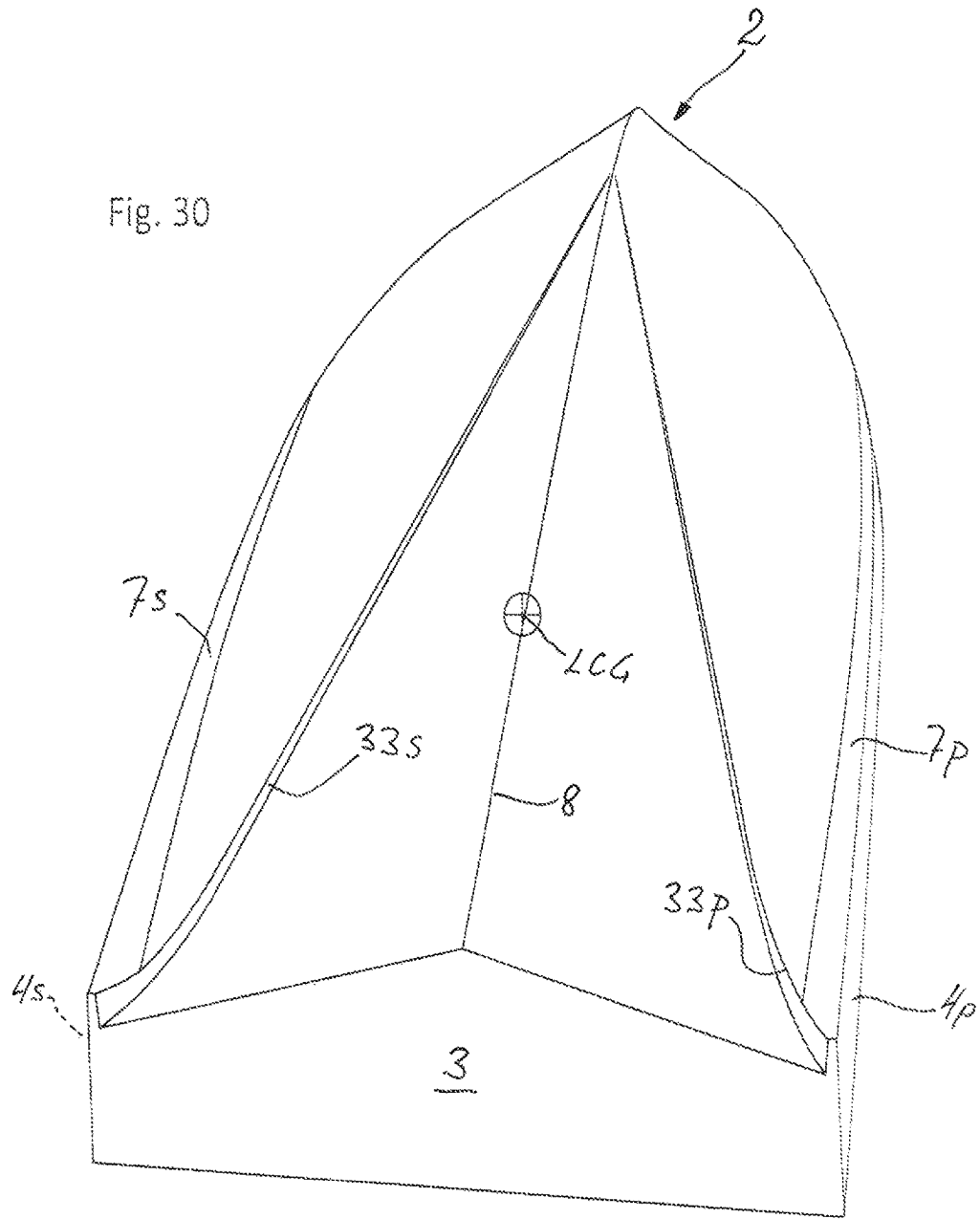

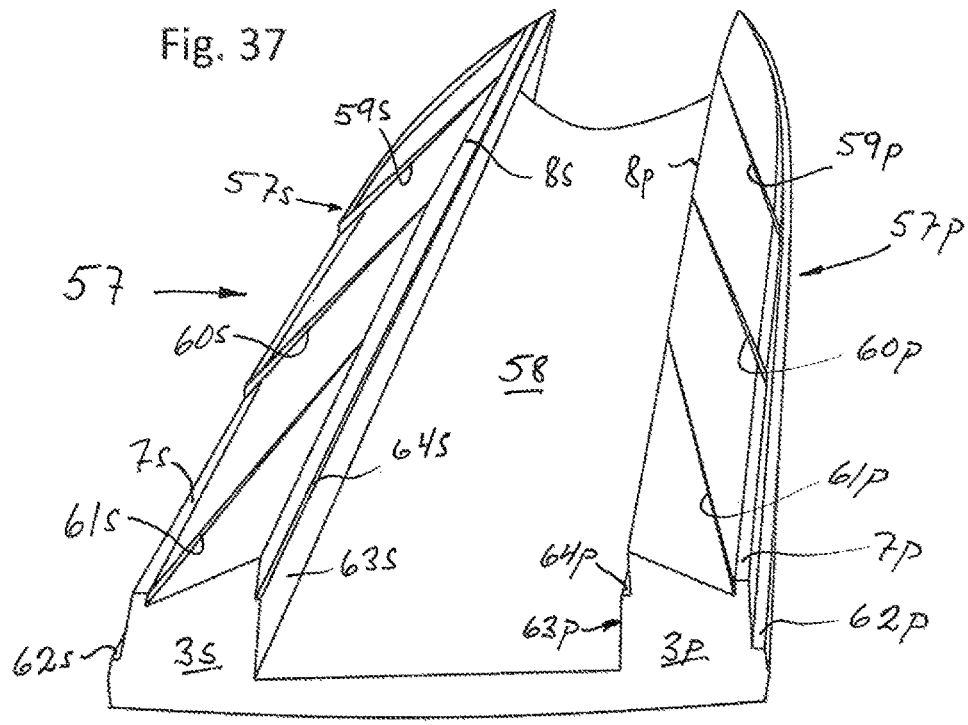
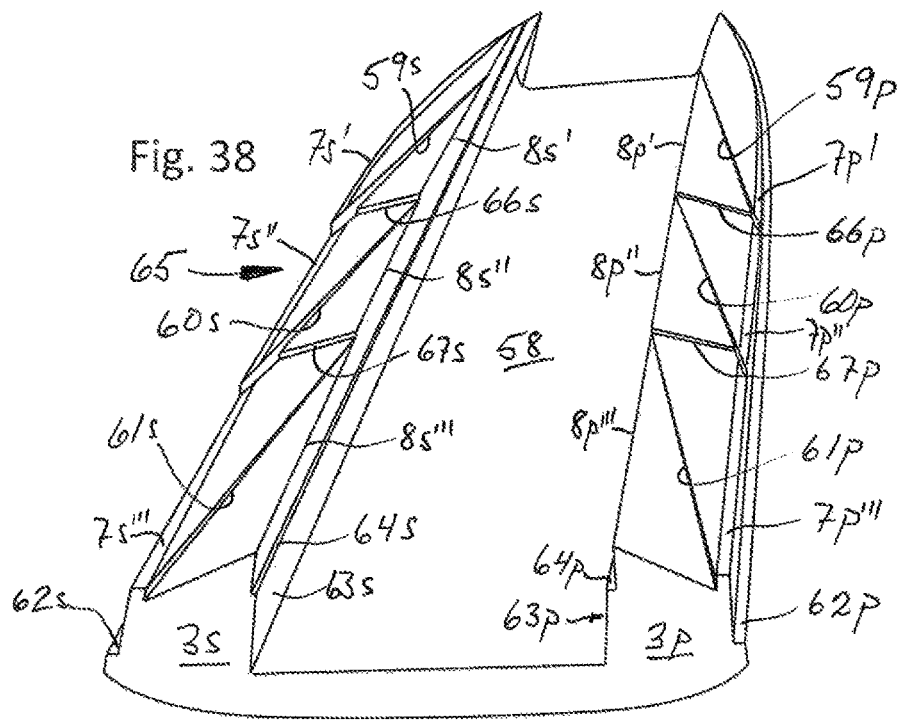

WATERCRAFT VESSEL WITH A PLANING HULL

FIELD OF THE INVENTION

The present invention concerns a watercraft vessel with a planing hull, which on one or both sides of a keel region has a bottom portion and a side portion. The vessel may comprise a unitary hull, or it may alternatively comprise two or more separate hulls that are interconnected to form for example a catamaran.

More specifically, the invention concerns such a watercraft vessel that is designed for cruising at a planing speed within a predetermined speed range, normally linked to predetermined drive powers and load ranges.

The bottom portion of the hull rises upwardly from the keel region towards the side portion of the hull at an angle, relative to a horizontal plane, referred to as the deadrise angle, in the interval 5°-70°, possibly varying sideways and/or along the length of the hull. Normally, the hull's bottom portion extends along the full length of the hull, measured along its water line at zero speed. The hull may have two or more longitudinally consecutive keel portions.

At least one water-deflecting surface extends longitudinally in relation to the keel region and is configured so as to create, by interaction with a lateral spray water stream, a lifting force component on the hull when cruising at a planing speed within the predetermined speed range. Accordingly, the hull will be lifted to a certain level upwardly when planing at such a speed.

The term "keel region" used herein refers to a real keel as well as a more imaginary, longitudinally extending portion or region of a hull bottom following a central keel line of a hull bottom.

The term "predetermined speed range" has a broader definition than merely referring to an absolute speed interval. It must, however, include at least one speed interval within which the hull planes, e.g. speeds above a lower speed limit, such as 10 knots for very small boats, or 15 knots for larger boats, or 20 knots for even larger boats. It may also include different speed intervals and these may partially overlap, e.g. 20-30 knots, 28-37 knots and/or 25-50 knots etc.

BACKGROUND OF THE INVENTION AND PRIOR ART

Within the field of designing planing watercraft, it is generally known to take advantage of the energy of spray water, which is displaced laterally when the hull is moved through sea water, by means of longitudinally extending water-deflecting surfaces, also known as "foils" or "lifting strakes", which are impinged by the displaced spray water. Numerous patents disclose various kinds of such foils or lifting strakes, e.g. U.S. Pat. Nos. 4,584,959 and 6,666,160 B1. Apart from using lifting foils or strakes, these prior art hulls are further provided with means for air lubrication of the bottom of the hull.

EP 1 685 020 B1 discloses a planing hull that includes a bottom portion and a side portion delimited by edges in the hull known as chines as well as a forward portion and an aft portion. The forward portion and the aft portion are offset relative to each other at a V-shaped step, the point of which is oriented forwardly. The step extends transversely between the two chines. Two tapered lateral skids, each projecting from the bottom of the hull in the vicinity of a chine, and the longitudinal axis of which is substantially parallel to the corresponding chine, are arranged on the aft portion of the hull. The aim of this design is to keep most of the bottom surface aft of the V-shaped step dry at planing speed. Thus, there are no surfaces that will be impinged by laterally moving water.

SE 405 584 (claiming priority from U.S. Pat. Nos. 167,737 and 237,852) discloses a watercraft vessel with a planing hull exhibiting a delta-shaped planing surface, which is exactly flat (0 degree deadrise) and forms a submerged part of the hull. The concave side portions of the hull can, according to the patent, be provided with water deflectors, adapted to re-direct upward flowing spray and/or splash water along the sides of the hull into a downward direction.

Furthermore, in the relevant prior art, there are also basic theories on flow behavior when a body moves through a fluid. Such theories have been presented by Herbert Wagner in "Jahrbuch der Schiffbautechnik", vol. 34, 1933, "Über das Gleiten von Wasserfahrzeugen" (English translation in National Advisory Committee For Aeronautics, Technical Memorandum, No. 1139, Washington, April 1948), and by Daniel Savitsky et al. in a paper entitled "On The Main Spray Generated By Planing Surfaces" published January 1958 by the Institute of the Aeronautical Sciences, and likewise by Daniel Savitsky et al., in a paper entitled "Inclusion Of Whisker Spray Drag In Performance Prediction Method For High-Speed Planing Hulls" published in Marine Technology, Vol. 44, No. 1, January 2007, pp. 35-56.

The theories presented in these papers form the basis on which the bottoms of modern high-speed watercraft are designed. The latter paper includes the following important information for a boat designer (col. 2, 1st paragraph):

"The present paper identifies the whisker spray (its area, flow direction and location); quantifies its contribution to total drag as a function of trim angle, deadrise angle and speed; and incorporates these results into a final prediction procedure. Further, the designer is given guidance as to the location, size, and geometry of spray strips that will deflect the whisker spray away from the bottom."

This knowledge forms the basis for most prior art designs of "spray strips" which deflect water to the sides (and in some cases slightly downwards) in order to create lift and reduce the wetted surface that causes friction.

When a planing hull moves through the surface of sea water, the water immediately adjacent the hull cannot be displaced laterally due to the inertia and the incompressible nature of the medium. This phenomenon is usually referred to as "wave rise" and is also the root cause of spray on the sides of a high-speed watercraft vessel. The formation of spray has been recognized as a problem since it is an essential part of the resistance of a planing boat ("The Spray Volume Shed by an Uncambered Planing Hull in Steady Planing"; Payne 1982). However, this problem has not been solved and seems to be ignored in all prior art planing hull designs. In any case, there are no known analyses of the potential to make positive use of the energy contained in the lateral spray.

According to Wagner (Jahrbuch der Schiffbautechnik), the wave rise increases the wetted region to create a stagnation line, where the flow speed is the lowest and the water pressure is the highest, above the hull/water surface intersection. This increased wetted region makes up the root for whisker spray.

The stagnation line is located inside this increased wetted region. The spray root, if seen from underneath, can normally be seen approximately as an isosceles triangle without a base with its tip pointing towards the bow. Its angles are not directly dependent on speed, but on the trim angle and the deadrise angle.

OBJECT OF THE INVENTION

From the boat's frame of reference, the whisker spray has the same speed as the incoming flow. However, the angle of the spray direction is approximately twice the angle of the stagnation line, measured out from the keel line. Thus, the whisker spray direction has a significant transversal component. Since the spray follows the laterally rising bottom portion of the hull, e.g. for a hull with a V-bottom, every transversal component also has a vertical component. These vertical and transversal components of the whisker spray account for much wasted energy. With prior art hulls, only a minor part of this energy can be utilized for lifting the hull to a certain extent, thus leaving room for much improvement.

The object of the present invention is to provide a structure of the hull which takes advantage of all the velocity components of the whisker spray, thereby achieving an extra forward thrust that results in increased cruising speed and/or reduced fuel consumption for a given speed, as well as a higher cruising comfort.

SUMMARY OF THE INVENTION

According to the present invention, said at least one water-deflecting surface, as seen from underneath and along a major longitudinal part thereof, extends rearwardly and obliquely away from the keel region, at a lateral distance outside but adjacent to an outer boundary of an approximately triangular bottom part of said bottom portion, said approximately triangular bottom part being submerged, in relation to the ambient sea water level, when cruising at a special planing speed, within said at least one predetermined speed range.

The deflecting surfaces should face inwards towards the keel region and rearwards towards the stern to provide the desired forward thrust and lift.

The distance of said water-deflecting surface from said outer boundary is such that, when cruising at said special planing speed, there is accommodated, laterally outwardly of said outer boundary, a spray area, which constitutes an additional wetted hull bottom surface area, where said lateral spray water stream is generated when the submerged bottom part meets the sea water at said special planning speed and flows laterally outwardly and strikes against said water-deflecting surface, whereby the spray water stream is deflected downwardly and rearwardly so as to generate, in addition to said lifting force, a forward thrust on the hull.

In this way, the velocity components of the lateral spray water stream are used by the present invention, by redirecting the spray to a great extent rearwardly, unlike prior art technology. Also, if configured in accordance with the invention, there will be no resistance or obstacle to water created by the deflecting surfaces, e.g. at lower speeds and/or when cruising in heavy waves. On the contrary, the water-deflecting surfaces will reduce the retardation caused by the waves or even give an extra forward thrust when the hull slams into waves.

Tests performed with hulls designed according to the present invention, compared to a corresponding prior art hull, have clearly proved that all the objectives of the invention have been fulfilled, including lower fuel consumption and a significantly softer ride.

Further preferred features are stated in the dependent claims and will also appear from the detailed description below.

BRIEF DESCRIPTION OF THE DRAWINGS

Examples of preferred embodiments of the invention will be described hereinafter, with reference to the accompanying drawings, wherein:

FIGS. 3 and 3a is a section taken along line III-III in FIG. 2 and an enlarged portion thereof, respectively;

FIGS. 4 and 4a is a section taken along line IV-IV in FIG. 2 and an enlarged portion thereof, respectively;

FIGS. 7 and 7a is a section taken along line VII-VII in FIG. 2 and an enlarged portion thereof, respectively;

FIGS. 8 and 8a is a section taken along line VIII-VIII in FIG. 2 and an enlarged portion thereof, respectively;

FIGS. 9 and 10 are sections taken along line III-III in FIG. 2, with FIG. 9 showing an embodiment having flat deflectors standing at an angle in relation to the bottom of the hull, and FIG. 10, showing, as a comparison, a hull having concavely curved deflectors;

FIGS. 11b and 11c show a respective portion elliptically encircled in FIG. 11a;

FIG. 12 is a bottom view of a hull according to the present invention and FIG. 12a is a section of a starboard portion thereof also showing a part of the surrounding water:

FIG. 13 is a bottom view of a prior art hull and FIG. 13a is a section of a starboard portion thereof also showing a part of the surrounding water;

FIG. 14 is a side view of a hull similar to that in FIGS. 1 and 2 cruising in water;

FIGS. 15, 16 and 17 are partial sections taken along lines XV-XV, XVI-XVI and XVII-XVII, respectively, in FIG. 14;

FIG. 26 is a perspective bottom view of an embodiment of the present invention having a concave bottom portion and longitudinally convex deflectors;

FIG. 27 is a perspective bottom view of an embodiment of the present invention having a convex bottom and longitudinally concave deflectors;

FIG. 30 is a perspective bottom view of a further embodiment of the present invention being a variant of that in FIG. 23;

FIG. 37 is a perspective bottom view of an embodiment of the present invention in the form of a catamaran;

FIG. 38 is a perspective bottom view of a further embodiment of the present invention in a modified catamaran;

DETAILED DESCRIPTION OF PREFERRED EMBODIMENTS OF THE INVENTION

In the following detailed description, the letters 's' and 'p' denote equal items or parts located on the starboard and port half or side of a hull, respectively.

Figure 1:
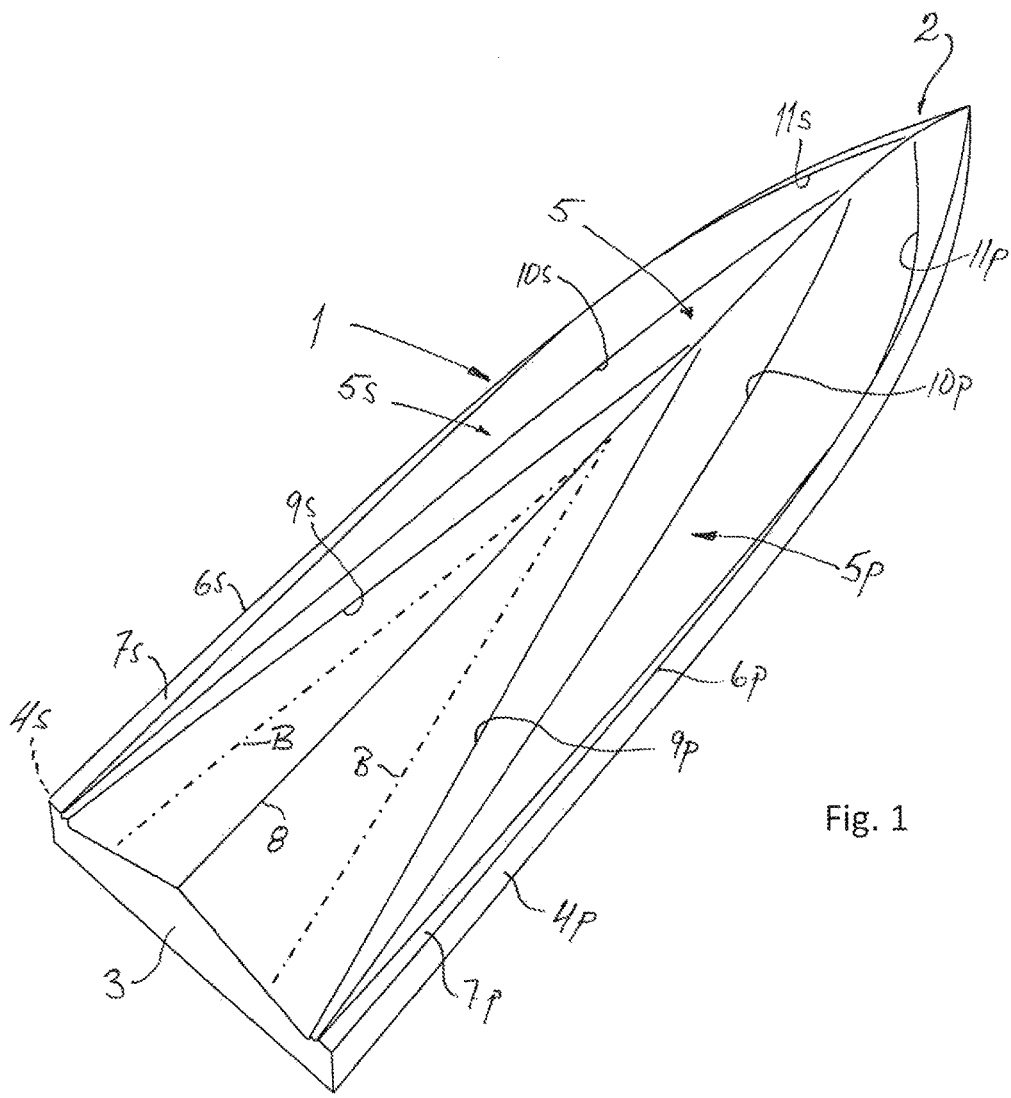
FIG. 1 is a perspective bottom view of a first embodiment of a watercraft vessel according to the present invention.

The first embodiment of the present invention shown in FIG. 1 is a V-bottom hull 1 having a bow 2, a stern 3, hull sides 4s and 4p, a bottom 5 comprising a starboard bottom portion 5s and a port bottom portion 5p. The respective side and bottom portions are separated by a chine 6s, 6p. Conventional lifting strakes 7s and 7p are located in the respective starboard and port chine region. A longitudinal keel line 8 separates the bottom portions 5s and 5p.

Figure 2:
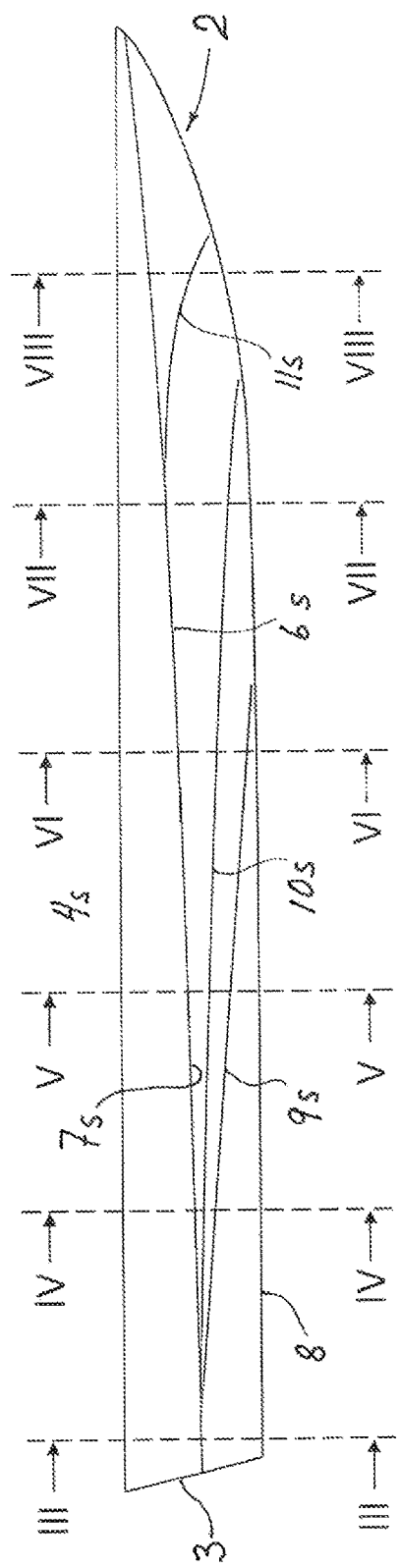
FIG. 2 is a side view of the watercraft vessel of FIG. 1.
Figure 5:
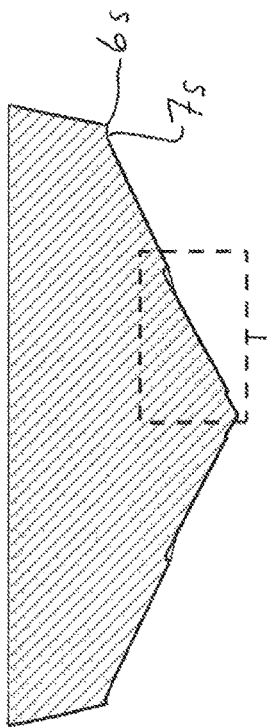
FIGS. 5 and 5a is a section taken along line V-V in FIG. 2 and an enlarged portion thereof, respectively.
Figure 5A:
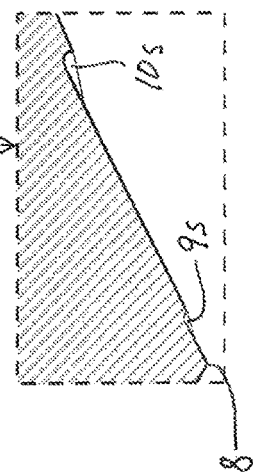
Figure 6:
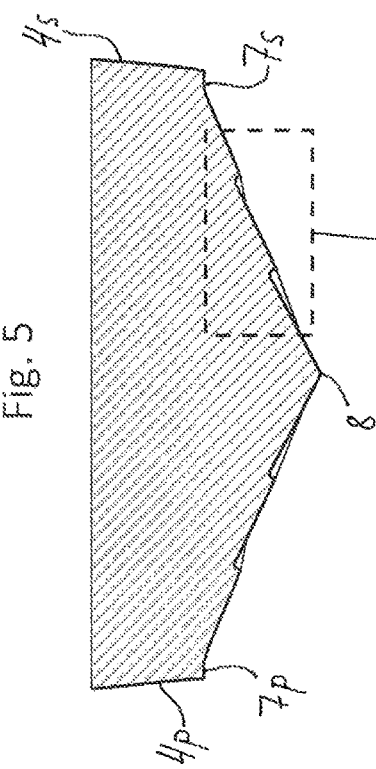
FIGS. 6 and 6a is a section taken along line VI-VI in FIG. 2 and an enlarged portion thereof, respectively.
Figure 6A:
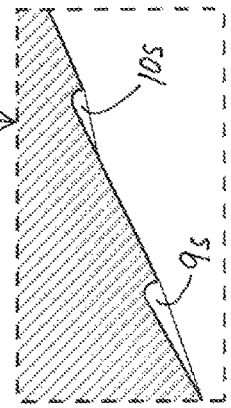

FIG. 2 shows a side view of the hull 1 of FIG. 1. Sections III-III to VIII-VIII are indicated by dashed vertical lines, marked correspondingly. These sections are shown in FIGS. 3 to 8 with respective part enlargements in FIGS. 3a to 8a. Generally, the deadrise angle in the bottom portions increases from the stern 3 to the bow 2.

A hull according to the present invention has at least one flow deflector on each bottom portion. In this first embodiment according to FIG. 1, the hull 1 has three flow deflectors on each bottom portion 5s, 5p. A first pair of inner deflectors 9s, 9p start in the longitudinal mid area of the hull and extend rearwardly and obliquely away from the keel region and end in the stern 3, relatively close to the respective chine 6s, 6p. The deflectors 10s, 10p, start aft of the bow region 2 and end in the stern 3, substantially merging with the respective lifting strake 7s, 7p. As seen in FIGS. 1 and 2 and in the sectional views seen in FIGS. 3 to 8, the deflectors 9s, 9p and 10s, 10p respectively, converge or approach one another towards the stern 3. The deflectors 11s, 11p start in the bow region and extend outwardly to merge with the chine 6s, 6p.

In FIG. 1, there are two dash-dotted lines, denoted B, symbolizing an outer boundary of the aforementioned submerged part, the line thus indicating the hull/water level intersection at cruising speed.

According to the present invention, preferred longitudinal angles of the flow deflectors in relation to the keel line 8, as seen from above or from underneath, and at least in a major longitudinal part thereof, is 3° to 40°, and most preferred 5° to 35°. This longitudinal angle may vary along the length thereof, either with a decreasing angle rearwardly or with an increasing angle rearwardly, or a combination of both.

It appears from the respective section that the height of the deflectors increase in a rearward direction, from a zero height in their forward ends (FIGS. 5 and 6) to a respective maximum height in the stern region (FIG. 3).

Preferably, the maximum height of the deflectors is 3% of the width of the hull, possibly even higher, e.g. up to 6% of the width of hull, e.g. a maximum height of 6 cm for a hull with a length of 7.2 m and a width of 2.0 m.

The cross-sections in FIGS. 3 to 8 also show that each deflector is concavely curved in this embodiment.

FIG. 9 shows a section through a hull similar to that according to FIGS. 1 and 2. Its flow deflecting surfaces or deflectors 12s, 12p and 13s, 13p have flat surfaces forming an angle with the respective adjoining bottom portion. As seen in this cross-section through the hull, each deflector generally extends downwardly from the adjacent hull bottom region at a downward angle, in relation to a longitudinal, vertical plane, in the range of 35° inwardly towards the keel region to 45° outwardly away from the keel region (compare also FIG. 39). Generally (compare also FIGS. 3 to 8), according to a preferred feature of the invention, the downwardly extending water-deflecting surface has a lower longitudinal edge located at a higher level than the keel region, so that the lower edge forms a transition to a laterally outer part of the bottom portion of the hull. In this way there will be a reduced resistance compared to prior art design when the hull temporarily dives downwardly or slams in waves during cruising.

For comparison, FIG. 10 shows a corresponding section through a hull according to FIGS. 1 and 2 having concavely curved flow deflectors 9s, 9p and 10s, 10p. While the respective inner flow deflectors 9s, 9p and 12s, 12p are designed for resistance lowering purposes, the outer deflectors 10s, 10p and 13s, 13p, respectively, are designed primarily for damping slamming when cruising in heavy sea. Likewise, the deflectors 11s, 11p are intended for damping slamming and preventing spray from reaching the deck.

Figure 11A:
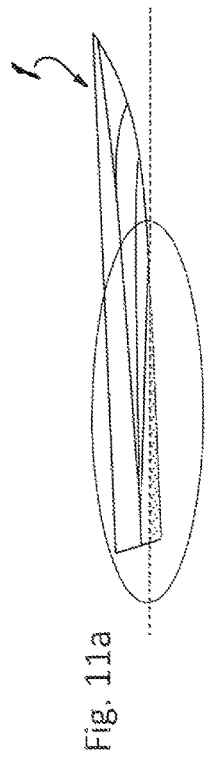
FIG. 11a is a side view at a smaller scale of a hull corresponding to that in FIG. 2.
Figure 11B:
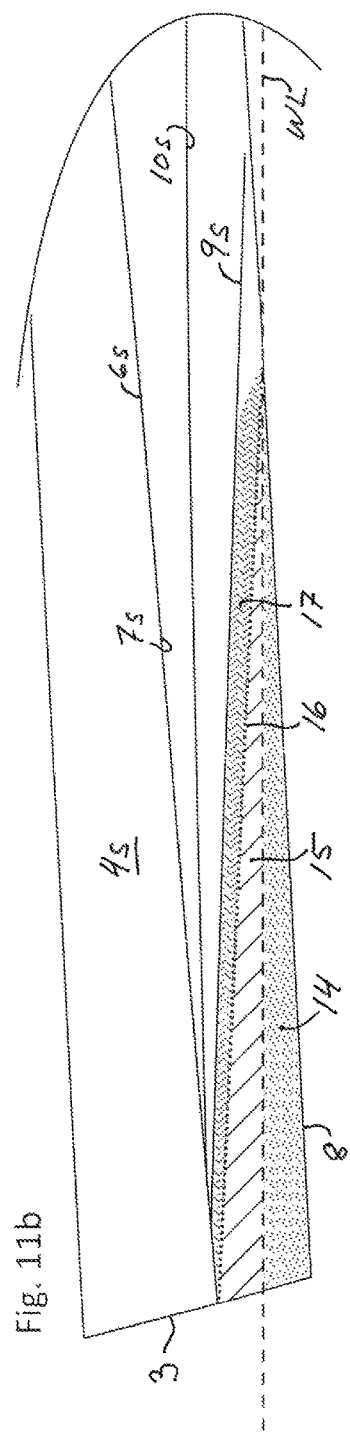

FIG. 11a shows a side view of a hull 1 at a smaller scale to that shown in FIG. 2. An elliptically encircled area in FIG. 11a is shown at a larger scale in FIGS. 11b and 11c, where a dotted hatching symbolizes the submerged, approximately or substantially triangular part 14 of the bottom of the hull. This bottom part (more clearly shown in FIG. 12) is submerged in relation to the ambient sea water level when cruising at planing speed. A line defining the water level is denoted WL.

Above this line WL the so-called wave rise 15 is shown, here symbolized by rearwardly inclined hatching. A dotted line 16 symbolizes the above mentioned stagnation line and the spray root. A zigzag hatching 17 symbolizes the spray area, which is located laterally outside the boundary of the submerged part 14 and adds to the wetted hull bottom surface area.

Figure 11C:
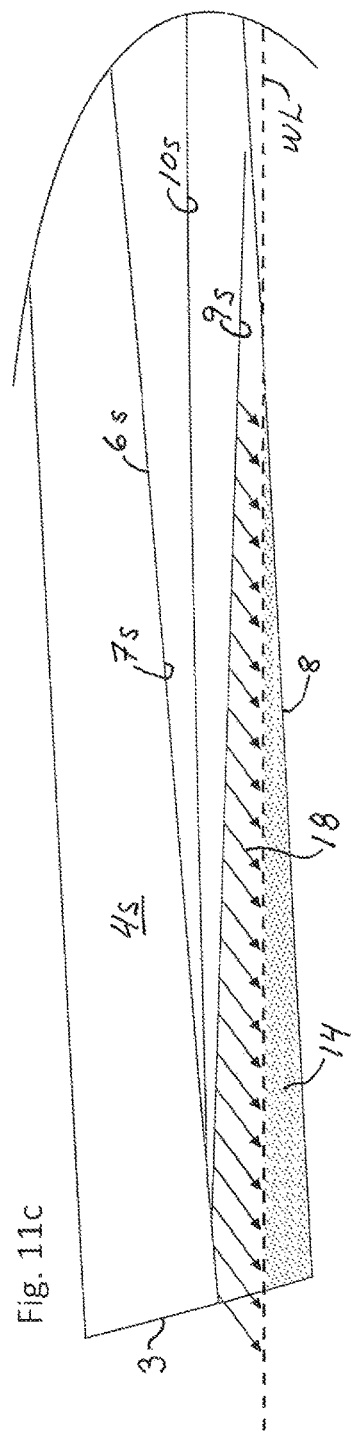

FIG. 11c illustrates the result when the spray water stream moving laterally outwardly and upwards within the spray area impinges onto the flow deflector 9s causing its flow direction to be deflected in a rearward and downward direction as indicated by arrows 18.

FIG. 12 shows a bottom view of a hull similar to that shown in FIGS. 1 and 2. FIG. 13 shows a similar view of a corresponding prior art hull having merely longitudinally (in parallel to the keel line) extending lifting strakes 19. In both cases, the similar triangular shape of the respective submerged bottom parts 14, 14' can be seen. In both cases, the respective wave rise 15, 15' is also shown.

In FIG. 12, illustrating a hull according to the invention, the spray area at 17, forming a wetted hull bottom surface area, extends from the outermost part of the wave rise 15 to the inner deflecting surface 9s, 9p. In this case the water-deflecting surface is concavely curved, as seen in cross-section through the hull, (but may alternatively be flat or convexly curved) and extends in the longitudinal direction at a distance from and essentially in parallel to the outer boundary of the submerged bottom part 14. Alternatively, the deflector may diverge from or converge towards said boundary, or even intersect with the boundary, e.g. at an end portion.

At the deflectors 9s, 9p, the lateral spray stream is deflected or redirected rearwardly (FIG. 12) and downwardly (FIG. 12a) into a downward and rearward direction 18, thereby effecting a lift and a forward thrust on the hull.

In FIG. 13, on the other hand, the spray area at 17' extends from the outermost part of the wave rise 15' to the respective lifting strake 19 which extends longitudinally in parallel to the keel line. The resulting spray stream 18' is only slightly deflected downwardly to create some lift. Its main direction remains substantially lateral (FIG. 13a), without any increase in the rearward velocity component and without causing any forward thrust. Thus, the energy contained in the spray stream 18' is hardly utilized at all, and is largely wasted.

Also, when comparing FIGS. 12 and 13, one can notice that the wetted area from the spray at 17 and 17' respectively, is of comparable size but may be lower on a hull according to the invention, as in FIG. 12.

In the side view of FIG. 14, a hull similar to that shown in FIGS. 1, 2, 11a and 12 is shown to be partly submerged at planing speed, with the submerged part 14 below the water level WL. The spray deflected by the deflector 9s in hull sections XV-XV, XVI-XVI and XVII-XVII is shown in FIGS. 15, 16 and 17 by arrows $S_1$, $S_2$ and $S_3$. These sections are taken at right angles to the deflector 9s (see FIG. 14a) and are, thus, angled in relation to perpendicular cross-sections. These figures are intended to illustrate one useful aspect of the present invention, namely, how to trim or balance a hull by varying the curvature and/or the height of each deflecting surface.

It can be seen that in FIG. 15, section XV-XV in the aft portion of the hull, the thickness of the spray in the spray area is the greatest, as compared to FIGS. 16 and 17. Therefore, the radius of the concavely curved flow deflector 9s should be the largest in this section in order to take advantage of the energy contained in the spray. It can also be seen from FIG. 15 that the curvature of the flow deflector 9s encircles about 150°, and that the downward angle (of a tangent at the lower edge of the deflector) is about 35° inwardly towards the keel region, in relation to a vertical plane parallel to the deflector. This configuration will result in a relatively small flow deflection of the spray $S_1$ downwards, whereas a major part thereof is deflected rearwards or aftwards, thus creating more forward thrust than lift (see the lowermost part of FIG. 15).

In section XVI-XVI, shown in FIG. 16, where the thickness of the spray in the spray area at 17 is smaller (than in FIG. 15), the radius of the flow deflector 9s is substantially smaller than in section XV-XV, and it covers a smaller encircling angle resulting in a more vertical spray $S_2$. This results in more lift and less forward thrust (see the lowermost part of FIG. 16).

In section XVII-XVII located near the longitudinal middle of the keel line and at the top of the triangular submerged part 14 of the hull, the spray area at 17 is the smallest and has the smallest thickness. The radius of the convexly curved flow deflector 9s is therefore the smallest and its curvature encircles about 90°, resulting in deflection of spray $S_3$ 90° away from the adjacent flat bottom portions, i.e. slightly outwards at about 15° away from a vertical plane parallel to the deflector. The spray $S_3$ is directed downwards and rearwards, with essentially equal lift and forward thrust components (see the lowermost part of FIG. 17).

Thus, by varying the radius of the deflector curvature and possibly also its encircling angle, or, its angle in relation to a vertical plane through and along the longitudinal extension of a flow deflector, it is possible to control trim in relation to nominal load, design speed etc.

Figure 18:
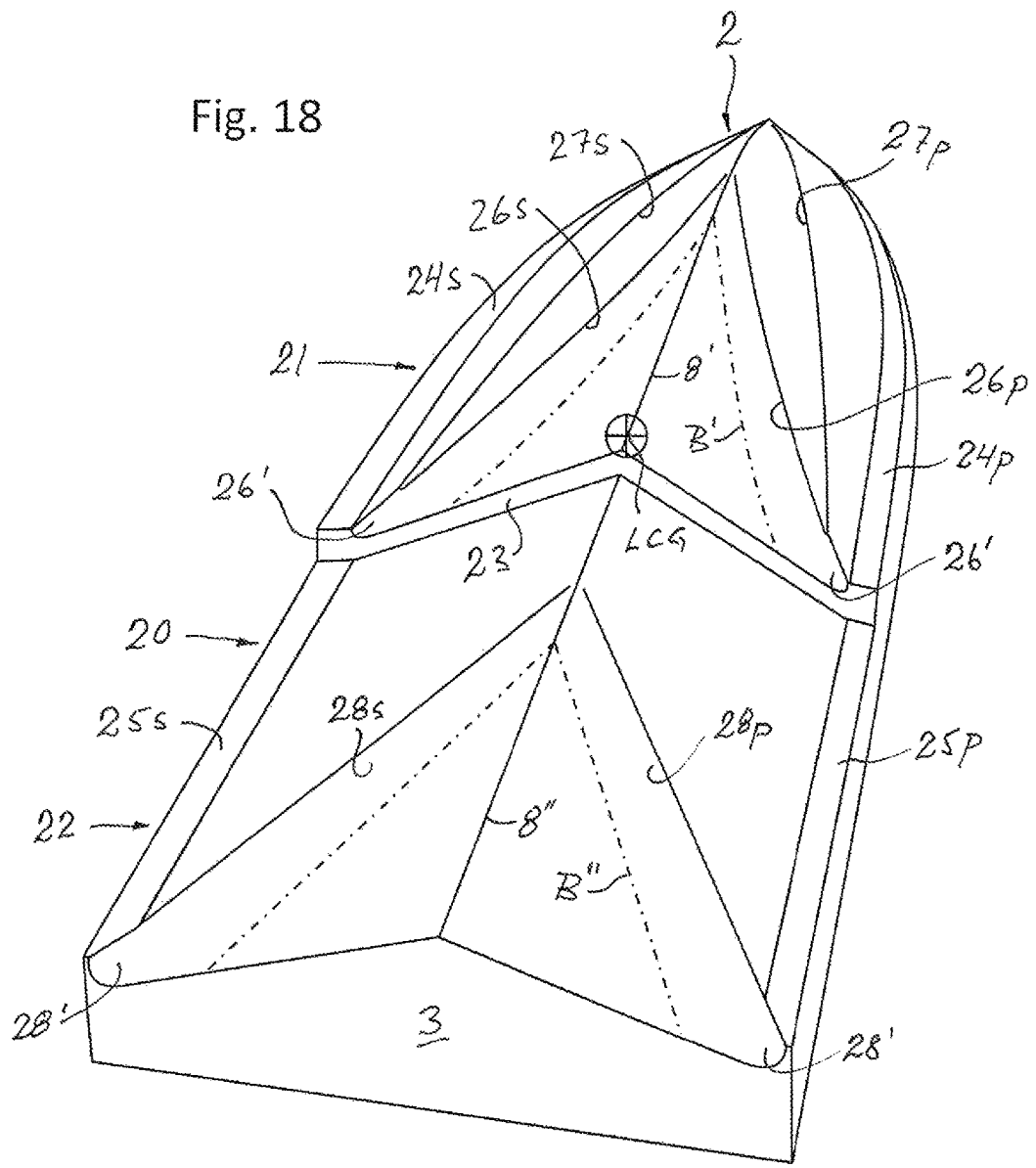
FIG. 18 is a perspective bottom view of an embodiment of the present invention having two bottom portions separated by a lateral step.

FIG. 18 shows a perspective bottom view of a hull 20 having a forward bottom portion 21 and an aft bottom portion 22. The bottom portions are separated, by a laterally extending step 23, into two longitudinally consecutive keel portions. In the position of the hull as shown, the aft bottom portion 22 is recessed in relation to the forward bottom portion 21. The keel is likewise separated into a forward keel portion 8' and an aft keel portion 8". The forward bottom portion has its conventional lifting strakes 24s and 24p, and the aft bottom portion has its conventional lifting strakes 25s and 25p. An encircled cross-symbol symbolizes the Longitudinal Center of Gravity (LCC) of this hull. As described so far, this embodiment of the hull is a conventional, stepped hull. However, each bottom portion also exhibits flow deflectors according to the present invention.

Thus, the forward bottom portion 21 has flow deflectors 26s, 26p extending rearwardly and outwardly away from the keel line from a point close to the keel line 8' to an end point at the step 23. These flow deflectors have concavely (as seen in a cross-section) curved deflecting surfaces 26', with a relatively large radius. The forward bottom portion 21 also has flow deflectors 27s, 27p starting in the bow region 2 and extending rearwardly and outwardly to intersect, at their end points, with the flow deflectors 26s and 26p. Likewise, these flow deflectors 27s, 27p have concavely curved deflecting surfaces, and they are intended, in the first place, to be effective in damping slamming.

The aft bottom portion 22 has flow deflectors 28s, 28p starting close to the keel line 8" and extending rearwardly and outwardly, and ending at the stern 3, where they cross with the respective lifting strake 25s, 25p. As seen in the intersection region, these flow deflectors also have concavely (as seen in a cross-section) curved water-deflecting surfaces 28' with a relatively large radius.

In this embodiment of the present invention, the flow deflectors 26s, 26p of the forward bottom portion 21 are operative at lower speeds, when a triangular portion inside of the flow deflectors 26s, 26p is wet, i.e. partly submerged below the ambient sea water level. Simultaneously, at lower speeds, the aft bottom portion 22 is likely to be wetted to a larger extent, where its wetted triangular surface extends outside the deflectors 28s, 28p, which, thus, do not interact with any spray stream.

With increasing speed, the wetted triangular part of the forward bottom portion 21 will successively move aftwards while, likewise successively, the triangular wetted part of the aft bottom portion 22 becomes smaller and the flow deflectors 28s, 28p of the aft bottom portion 22 become operative as soon as the wetted triangular part thereof is located inside of these flow deflectors 28s, 28p. At this point, the surfaces just forward of the deflectors will become dry. Above a certain threshold speed, the deflectors of both bottom portions can be simultaneously and continuously operative. In this particular situation, the outer boundaries of the approximately triangular submerged parts are indicated by dash-dotted lines B' in the forward bottom portion 21 and B'" in the aft bottom portion 22.

When the hull is upright in its normal cruising position, the lower edge of the lateral step 23 and the aft edge of the aft bottom part 22 adjoining the stern 3 constitute the base of the respective triangular, wetted and submerged parts.

Hulls according to the present invention can be designed with many different parameters, e.g. varying speed, deadrise angle, LCG, weight, width etc, as well as with design objectives such as ride comfort. Embodiments shown in FIGS. 19 to 30 are variations of such parameter choice, showing the placement of the deflector on the different hulls.

Figure 19:
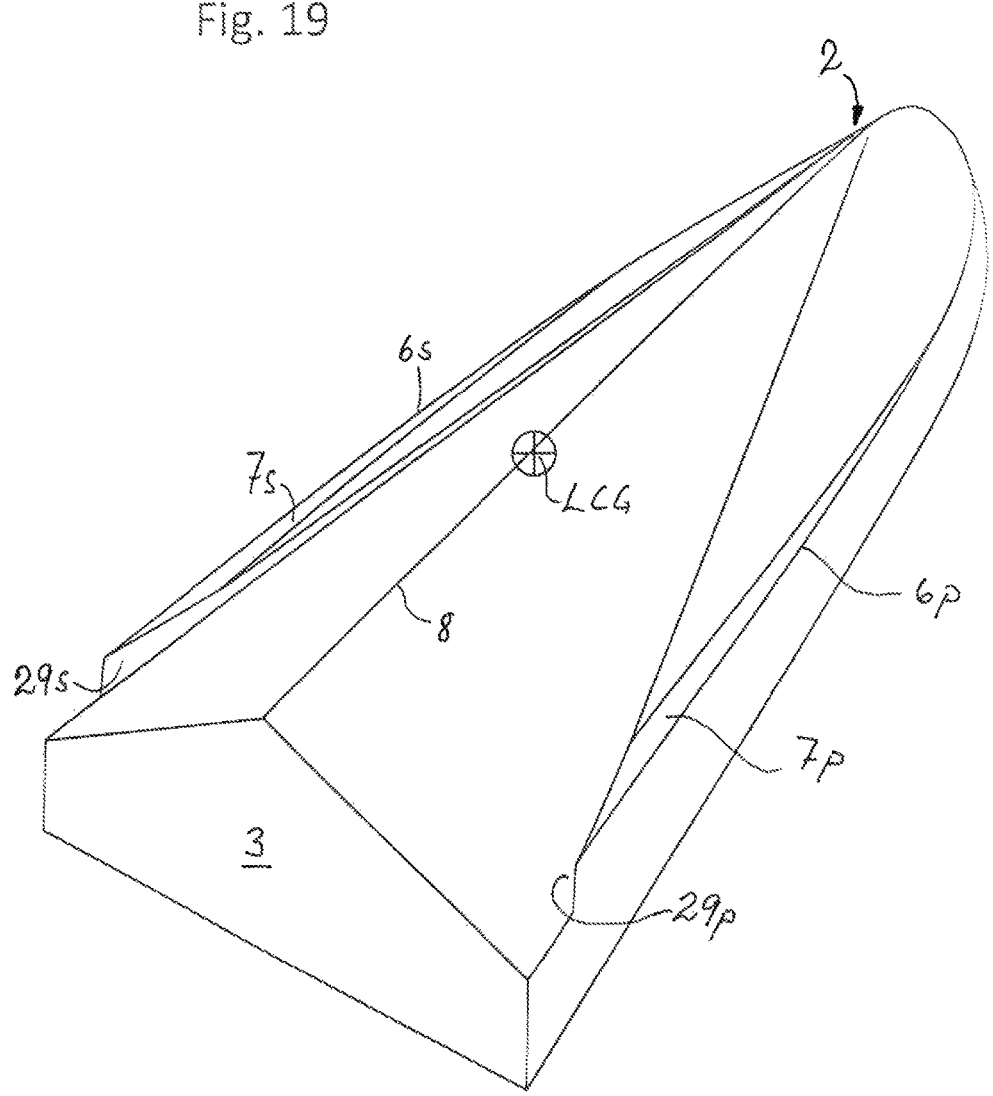
FIGS. 19-24 are perspective bottom views of further embodiments of the present invention having on each bottom half one flow deflector according to the present invention.

FIG. 19 shows a perspective bottom view of an embodiment of the present invention having a relatively sharp V-bottom or deadrise angle and a conventionally located Longitudinal Center of Gravity, LCG. Each bottom half (starboard and port) has only one flow deflector 29s, 29p starting in the bow region 2 and extending rearwards and outwards, away from the keel region, and ending at a point located at some distance forward of the stern 3. In this embodiment the flow deflectors have planar or flat flow deflecting surfaces that are essentially vertical in operation. Furthermore, each deflector starts at a point located close to the keel line, with zero height, and ends at a point where it intersects with the respective lifting strake 7s, 7p, at a maximum height.

Figure 20:
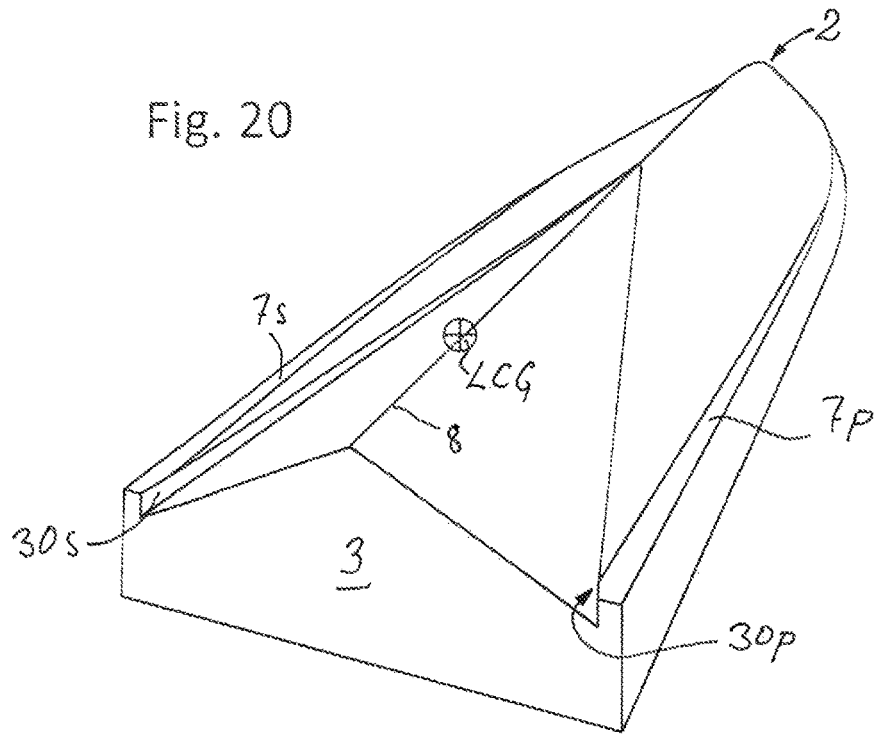

FIG. 20 shows a hull similar to that in FIG. 19, but having a more aftwardly located Longitudinal Center of Gravity, LCG. Its flow deflectors 30s, 30p start more aftwards than the flow deflectors of FIG. 19, and they end at the stern, where they partly intersect with the respective lifting strake 7s, 7p. In this embodiment as well, the flow deflectors have flat deflecting surfaces, the heights of which increase from zero at their start positions at the keel line 8 to a maximum height at the stern 3.

Figure 21:
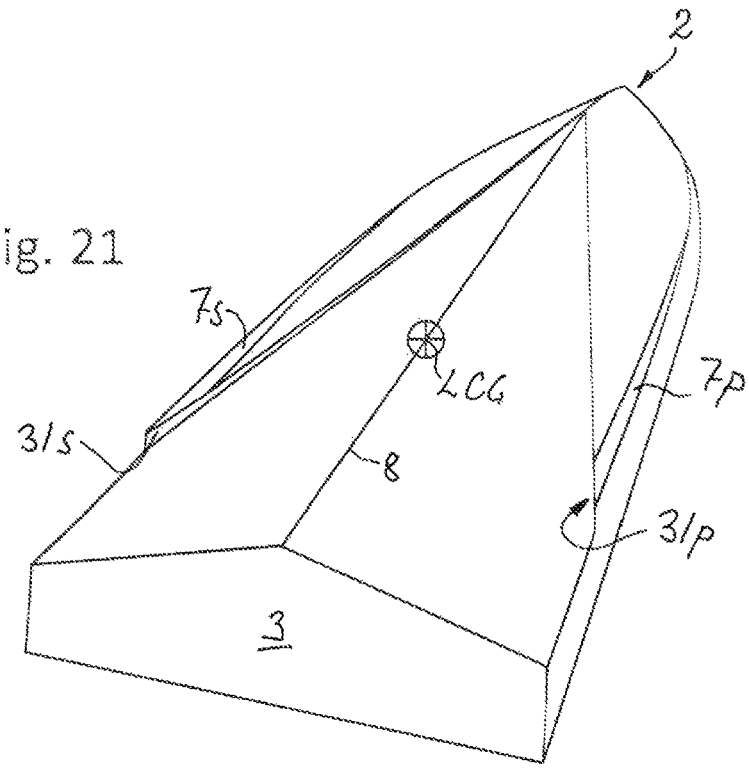

FIG. 21 shows a relatively long hull having a low V-profile and a conventionally located Longitudinal Center of Gravity, LCG. Its flow deflectors 31s, 31p start in the bow 2 and extend rearwardly and outwardly to end positions located at a substantial distance forward of the stern 3, again intersecting with the respective lifting strake 7s, 7p. Likewise, in this case, the flow deflectors have flat deflecting surfaces, the height of which increases from zero height at the bow to a maximum height at the end position.

Figure 22:
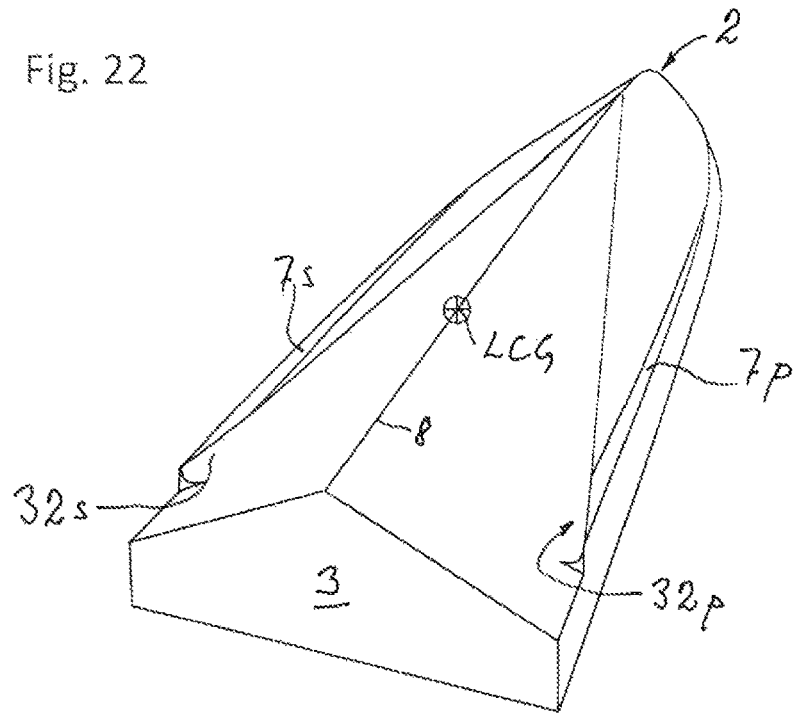

FIG. 22 shows a hull, which is similar to that in FIG. 19 in all respects except that its flow deflectors 32s, 32p have concavely curved deflecting surfaces, as seen in a cross-section.

Figure 23:
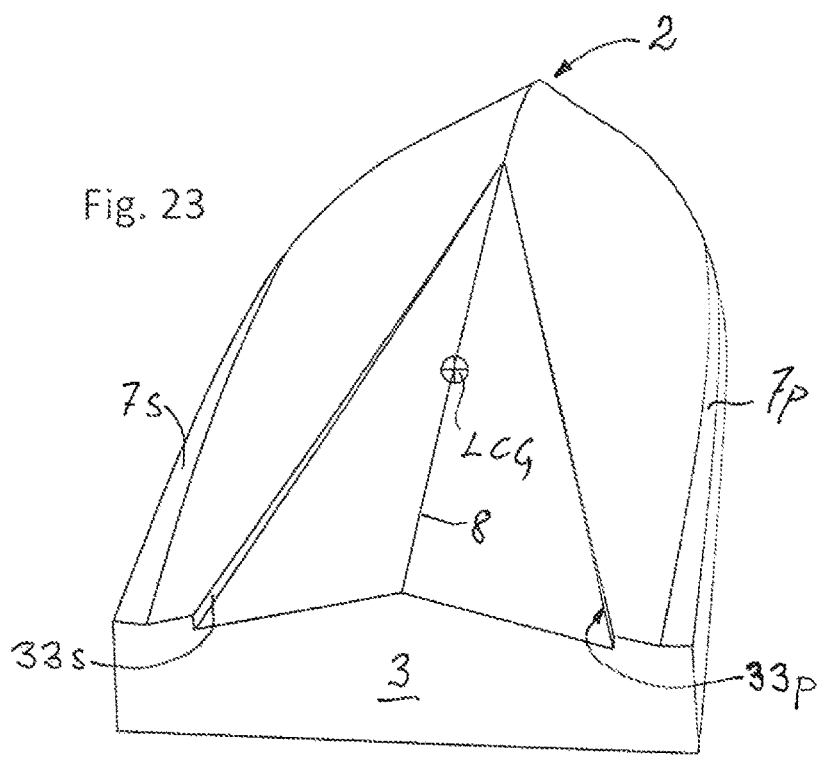

FIG. 23 shows a relatively short, wide and heavy hull having a small deadrise angle and a conventionally located Longitudinal Center of Gravity, LCG. Its flow deflectors 33s, 33p start just aft of the bow at the keel line 8 and extend rearwardly and outwardly to end in the stern 3 laterally inside of the respective lifting strake 7s, 7p.

Figure 24:
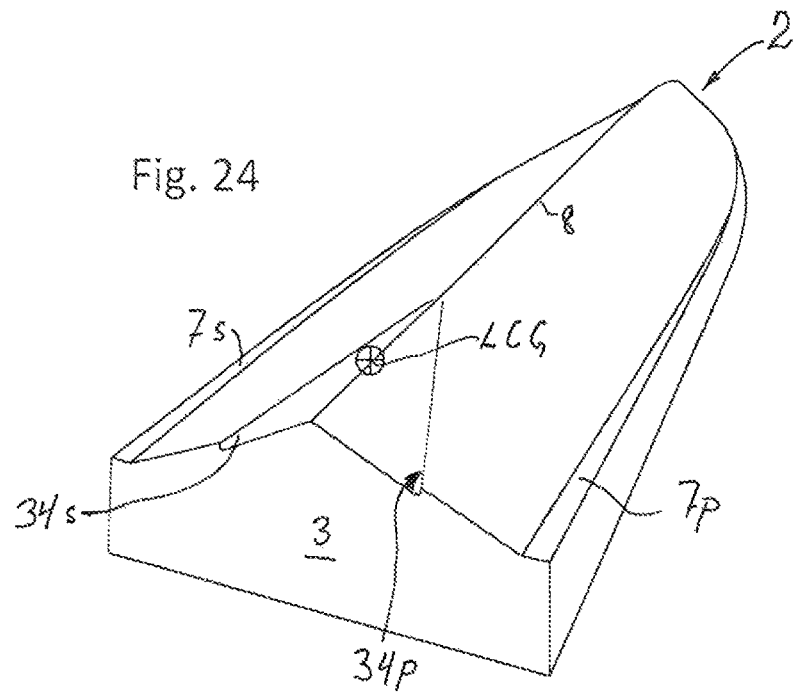

FIG. 24 shows a hull similar to that in FIG. 20 designed for very high speeds. Its Longitudinal Center of Gravity, LCG, is located in the aft region and its flow deflectors 34s, 34p start with zero height close to the keel line 8 clearly aft of its longitudinal mid-point, and end with a maximum height at the stern 3, around half-way between the keel line 8 and the respective lifting strake 7s, 7p. As seen at the stern 3, their deflecting surfaces are concavely curved, as seen in cross-section.

Figure 25:
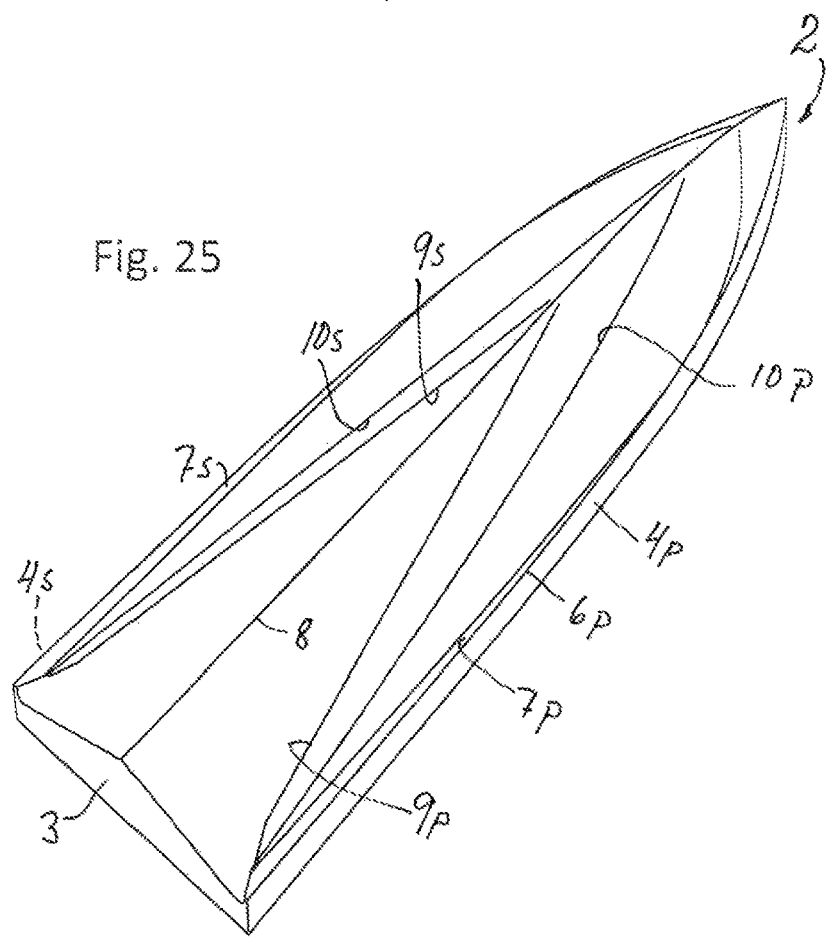
FIG. 25 is a perspective bottom view of an embodiment of the present invention being a variant of that shown in FIG. 1.

FIG. 25 shows a hull similar to the one shown in FIGS. 1 and 2. However, its flow deflectors 9s, 9p and 10s, 10p have been located to extend more outwards and closer to the respective hull side 4s, 4p. The outer, small-radius deflectors 10s, 10p meet with the inner large-radius flow deflectors 9s, 9p which end at the stern 3 close to the respective chine 6s, 6p and intersect the respective lifting strake 7s, 7p.

FIG. 26 shows a hull having two concavely curved bottom halves 35s, 35p. Longitudinally convex flow deflectors 36s, 36p extend from a point close to the keel line 8 and end at the respective hull side 4s, 4p, thereby creating a step 37s, 37p in the respective hull side and dividing the respective chine in a forward part 6s', 6p' and a aft part 6s'", 6p'", respectively. As clearly seen, the heights of the flow deflectors increase from zero height to a maximum height at the respective hull side 4s, 4p. The Longitudinal Centre of Gravity, LCG, is located near the longitudinal mid-point between the start and end points of the flow deflectors.

FIG. 27 shows a hull having two convexly curved bottom halves 38s, 38p. Longitudinally concave flow deflectors 39s, 39p extend from a point close to the keel 8a under a relatively blunt longitudinal angle and end at the respective hull side 4s, 4p, thereby creating a step 40s, 40p in the respective hull side and dividing the respective lifting strake in a forward part 7s', 7p' and an aft part 7s'", 7p'", and also dividing the respective chine into a forward part 6s', 6p' and an aft part 6s'", 6p'", respectively. Likewise, the heights of the flow deflectors increase from zero height to a maximum height at the respective hull side 4s, 4p. Also, the Longitudinal Centre of Gravity, LCG, is located substantially on the longitudinal mid-point between the start and end points of the flow deflectors.

Figure 28:
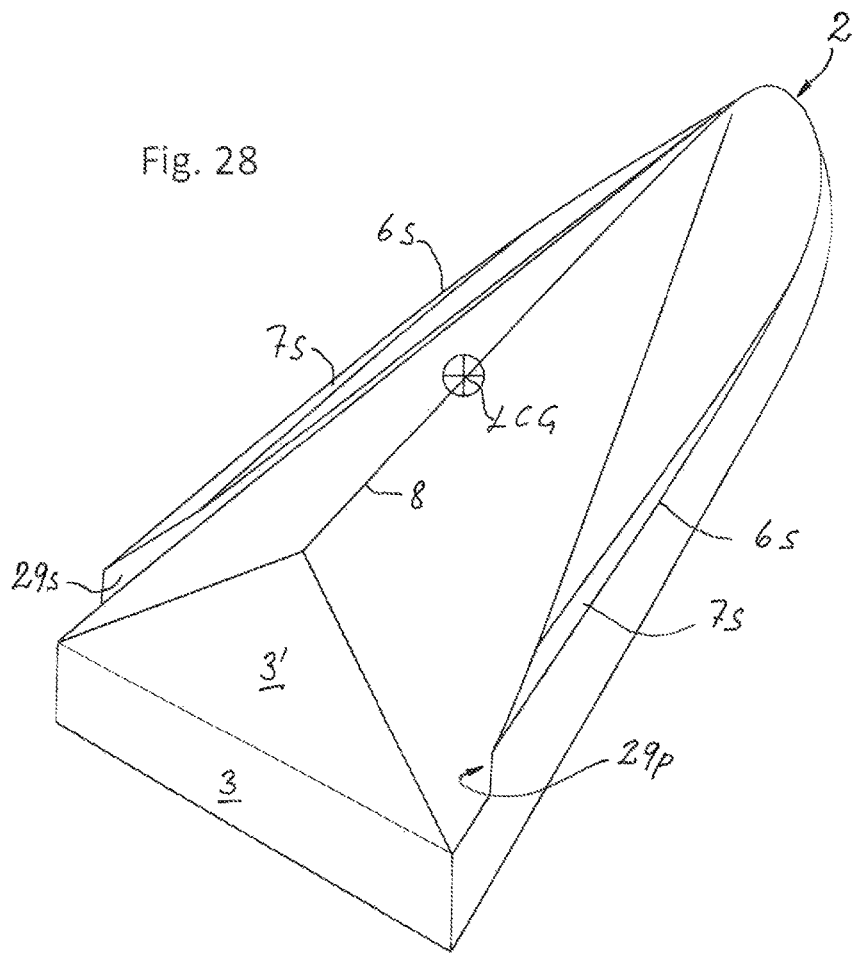
FIGS. 28 and 29 show a perspective bottom and a side view, respectively, of an embodiment of the present invention being a variant of the embodiment in FIG. 19.
Figure 29:
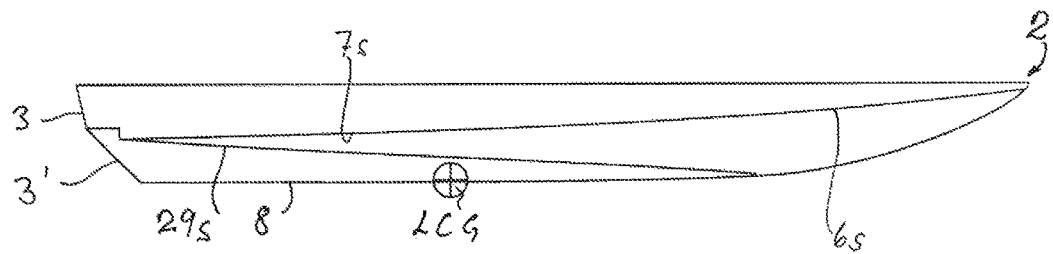

FIG. 28 shows a perspective bottom view and FIG. 29 a side view of a hull similar to that in FIG. 19, but having a lower part 3' of its stern 3 inclined downwardly and forwardly, thereby shortening its keel line 8. This is done in order to decrease the wetted surface and increase the trim angle.

FIG. 30 shows the same hull as that in FIG. 23, but its flow deflectors 33s, 33p have been convexly curved outwardly in their aft ends to end in the stern 3, intersecting close to the respective side 4s, 4p and partly cutting off an aft portion of the respective lifting strake 7s, 7p.

FIGS. 31-34 show different examples of how to build a flow deflector near the keel line.

Figure 31:
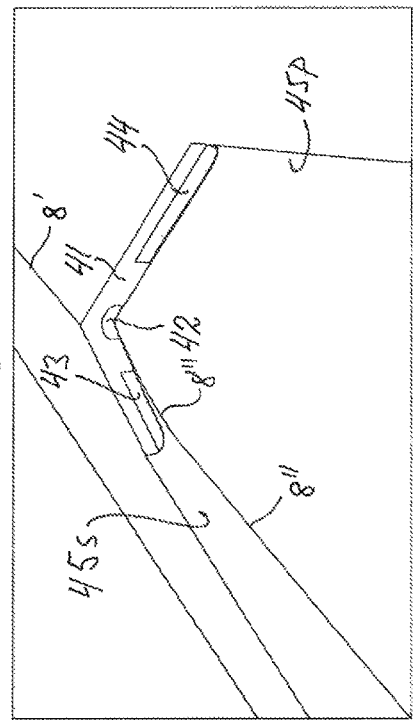

FIG. 31 shows a keel line vertically broken by a lateral step 41 into a forward portion 8' and an aft portion 8". The aft keel portion 8", is a straight extension of the forward keel portion 8', except for a vertically curved forward part 8'". Pressure equalizing air inlets 42, 43, 44 are arranged in the lateral step 41 in order to avoid vacuum build-up when this area of the bottom is submerged during cruising.

Figure 32:
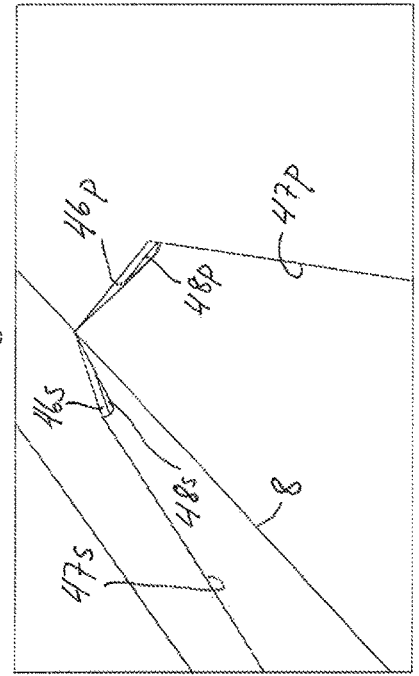
FIGS. 31-34 show details of hull bottoms that illustrate various methods of building up flow deflectors according to the present invention.

In FIG. 32, the keel line 8 is unbroken. Instead, each bottom half has a lateral step 46s, 46p starting at the keel line with zero height and ending at a relatively short distance therefrom at a maximum height, where the respective concavely curved flow deflector 47s, 47p start, thereby defining their height. Also in this case, it is possible to integrate vacuum equalizing air inlets 48s, 48p in the steps 46s, 46p.

Figure 33:
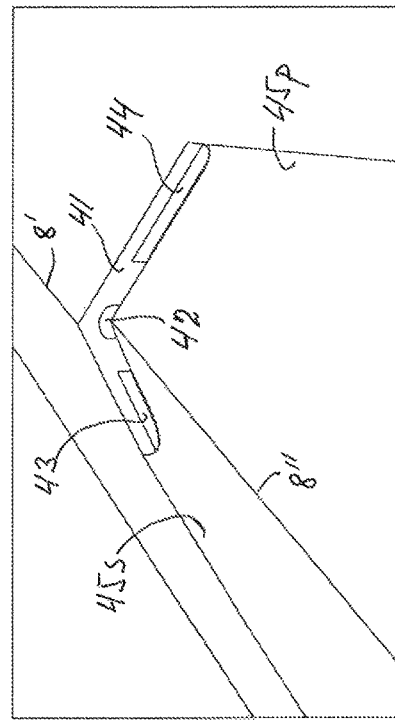

FIG. 33 shows an example similar to that of FIG. 31. The difference is that the lateral step 41 vertically offsets the forward keel line portion 8' and the aft keel line portion 8".

Figure 34:
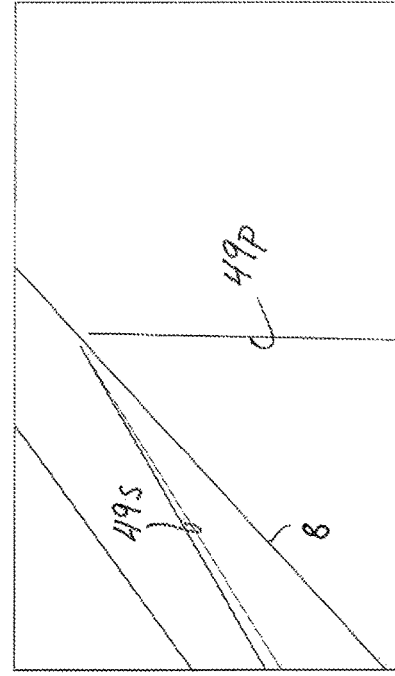

In FIG. 34, the keel line 8 is again unbroken and flow deflectors 49s, 49p (flat or curved) start at a point close to the keel line 8 at zero height and extend with an increasing height rearwardly and outwardly.

Figure 35:
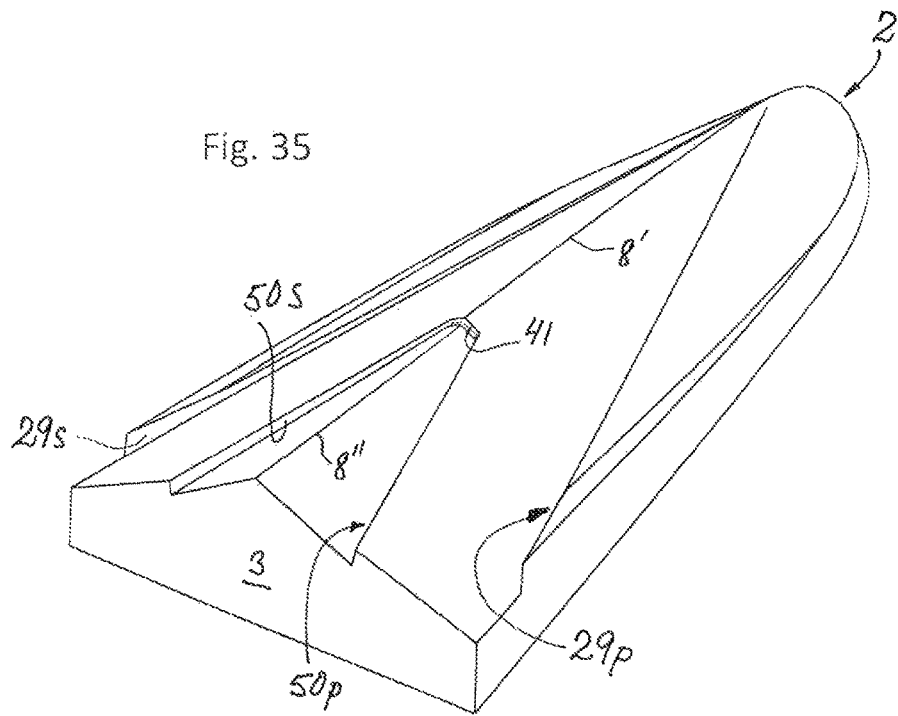
FIG. 35 is a perspective bottom view of a further embodiment of the present invention designed for two speed intervals.

FIG. 35 shows a hull designed for two different speed intervals within a predetermined, relatively large speed range. It essentially combines the bottom structures of FIGS. 19 and 24 by being provided with a first flow deflector pair 29s, 29p (like in FIG. 19) and a second flow deflector pair 50s, 50p, like in FIG. 24, although with flat deflector surfaces. The keel is vertically offset by a lateral step 41 into a forward keel portion 8' and an aft keel portion 8", substantially as in FIG. 33. Likewise, vacuum equalizing air inlets may be located in the step 41.

Figure 36:
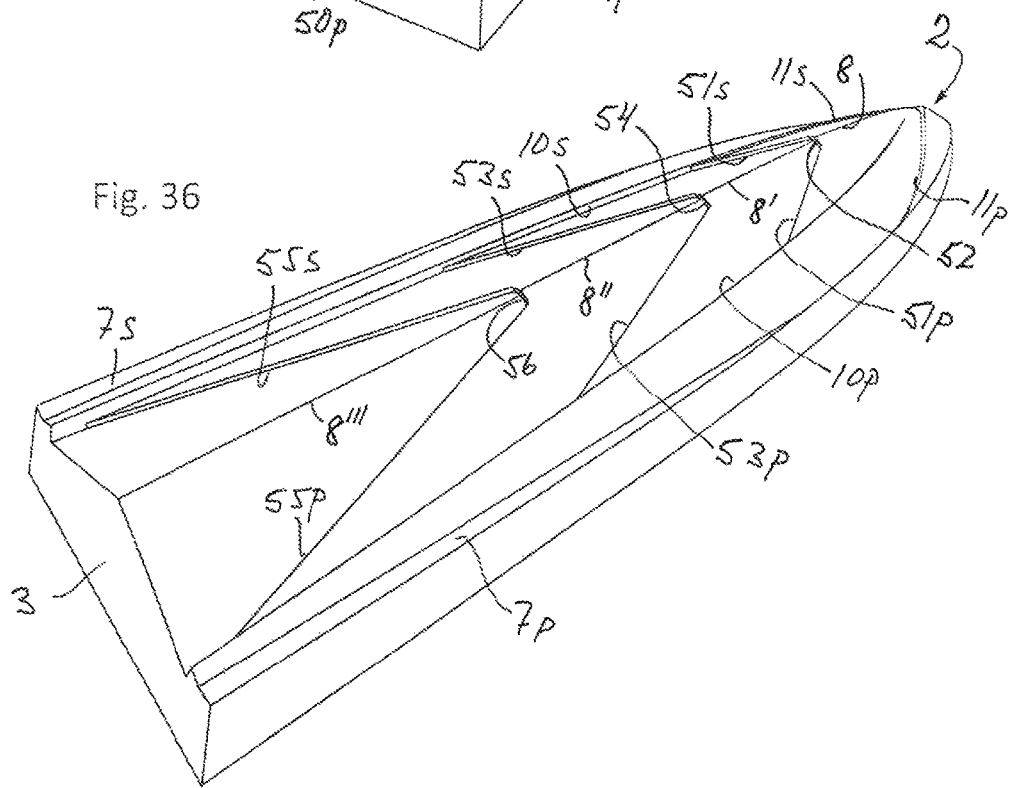
FIG. 36 is a perspective bottom view of a further embodiment of the present invention designed for three speed intervals.

FIG. 36 shows a further multi-speed hull, namely, one designed for three different speed intervals within a predetermined, very large speed range. Its basic design is like the hull in FIG. 1. Thus, it has bow deflectors 11s, 11p as well as more longitudinally directed flow deflectors 10s, 10p (having a smaller longitudinal angle relative to the keel line), which extend all the way from the bow region 2 and end in the stern 3 in the vicinity of the respective lifting strake 7s, 7p.

In this embodiment, three more pairs of flow deflectors are arranged at the bottom portion of the hull, all three being designed essentially like the arrangement in FIG. 33, with vacuum equalizing air inlets. A first pair 51s, 51p is located in the bow region and extends under a relatively blunt angle rearwardly and outwardly from a lateral step 52 and ends in the respective more longitudinally oriented flow deflector 10s, 10p. A second pair 53s, 53p, is located aft of the first one, extends rearwardly and outwardly from a lateral step 54 and ends midship in the respective more longitudinally oriented flow deflector 10s, 10p. A third pair 55s, 55p, starts substantially midship, and extends rearwardly and outwardly from a lateral step 56 located about midship, also ending in the respective more longitudinally oriented flow deflector 10s, 10p close to the stern 3. These three pairs of flow deflectors 51s, 51p, 53s, 53p, 55s, 55p will be operative successively with increasing cruising speed in a respective one of the three speed intervals, whereas the first mentioned pairs of deflectors 11s, 11p and 10s, 10p are operative mainly for damping slamming.

This hull has been designed for a wide speed range and has proved to provide a smoother ride and better energy efficiency throughout the entire planing speed range, compared to a well performing corresponding prior art hull.

The above embodiments of a watercraft vessel all comprise a single, unitary hull. In contrast, FIG. 37 shows an example of a catamaran 57 embodying the present invention. It comprises two hulls 57s and 57p, each having an unbroken keel line 8s, 8p, respectively. In accordance with the present invention, this hull structure may be regarded as a hull structure essentially like the one in FIG. 36, only that it has been vertically split along a keel line into two mirror-like and laterally separated hulls 57s, 57p. These hulls are rigidly interconnected by a suitable framework 58. Each hull has three pairs of flow deflectors: first deflectors 59s, 59p, second deflectors 60s, 60p and third deflectors 61s, 61p, respectively, each starting at the respective keel line 8s, 8p with zero height and extending rearwardly and outwardly so as to end with a maximum height at a respective lifting strake 7s, 7p. Furthermore, each hull has, on its outer side, a spray rail 62s, 62p, as well as, on its vertical inner hull side 63s, 63p, a corresponding spray rail 64s, 64p.

FIG. 38 shows a second embodiment of a catamaran hull 65 embodying the present invention. It essentially corresponds to the catamaran 57 in FIG. 37, including its flow deflectors. However, in FIG. 38, each hull has a first and a second conventional, lateral step 66s, 66p and 67s, 67p, respectively, extending from where the respective second (60s, 60p) and third (61s, 61p) flow deflector starts and dividing the respective keel line into three vertically offset keel line portions 8s', 8s", 8s'" and 8p', 8p", 8p'", respectively. The first steps 66s, 66p end near the respective rear end of the first flow deflector 59s, 59p. Correspondingly, the second steps 67s, 67p end near the respective end of the second flow deflector 60s, 60p.

Figure 39:
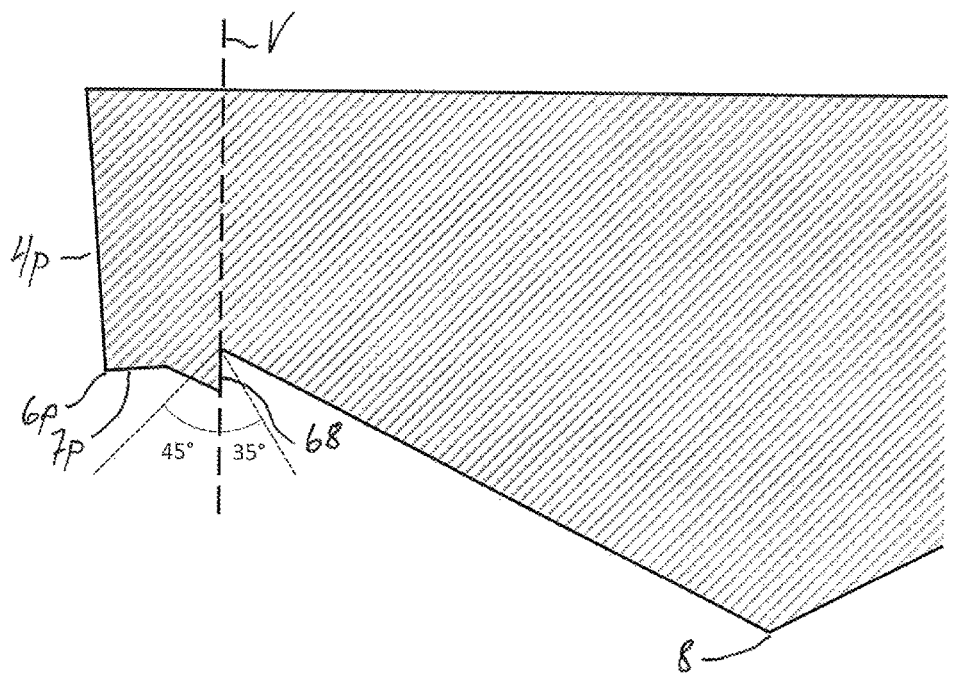
FIG. 39 is a part cross-section through a hull designed according to the present invention, showing a range of angles of a flat or planar flow deflector.

FIG. 39 shows a vertical part cross-section through a hull designed according to the present invention. A vertical longitudinal plane is indicated by a dashed line V. A flow deflector is shown to have a vertical, flat or planar flow deflecting surface 68. Furthermore, a preferred range of angles of the flow deflecting surface in relation to the vertical plane V is shown to be between 35° inwardly towards the keel line 8 and 45° outwardly away from the keel line.

Figure 40:
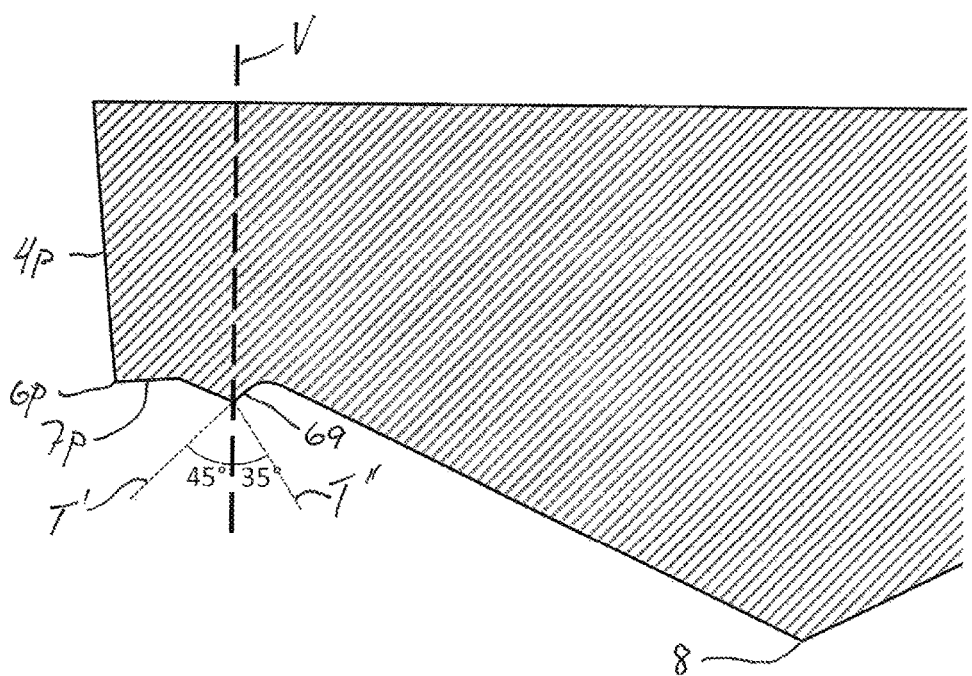
FIG. 40 is a further part cross-section through a hull designed according to the present invention, showing a range of angles of a concavely curved flow deflector.

FIG. 40 shows a further part cross-section through a hull with a flow deflector having a water-deflecting surface 69 which is concavely curved. A tangent at the lower edge is oriented in an angular interval between 45° outwardly (T') from the keel region (keel line 8) and 35° inwardly (T") towards the keel region, relative to the vertical longitudinal plane V.

The various embodiments described above, illustrate that those skilled in the art of planing hull design may vary the particular geometrical parameters widely within the scope of the appended claims, in particular within the scope of claim 1, in order to meet any specification for desired cruising speed range, intended loads, operation in calm or wavy waters, etc.

The invention claimed is:
1. A planing hull comprising:
  a keel region;
  a side portion extending from a bow to a stern, on a respective side of the keel region;
  a V-shaped bottom portion formed by opposing substantially planar surfaces extending from the keel region toward the side portion; and
  a chine portion separating the side portion and the V-shaped bottom portion;
  wherein the V-shaped bottom portion includes:
    a pair of opposed water-deflecting surfaces extending rearwardly and upwardly from the keel region and terminating adjacent to the chine portion or the stern, wherein the pair of opposed water-deflecting surfaces faces inwardly towards the keel region and rearwardly towards the stern, and extends downwardly, at an angle relative to a longitudinal vertical plane, from a respective substantially planar surface to a lower longitudinal edge thereof located at a higher level than said keel region; and
    a submerged bottom part forming an approximately triangular, laterally rising shape,
  wherein at least a portion of the pair of opposed water-deflecting surfaces extends at a lateral distance outside and substantially parallel to an outer boundary of the submerged bottom part,
  wherein the submerged bottom part includes a pair of opposing substantially planar surfaces extending laterally downward to the keel region, and
  wherein the V-shaped bottom portion includes at least one further water-deflecting surface, wherein the at least one further water-deflecting surface is configured to deflect a lateral water stream downwardly and rearwards at a first planing speed range,
  wherein the pair of opposed water-deflecting surfaces is configured to deflect a lateral water stream downwardly and rearwards at a second planing speed range, and wherein the first planing speed range is lower than the second planing speed range.

2. The planing hull according to claim 1, wherein the pair of opposed water-deflecting surfaces start in the keel region at a longitudinal position forward of a center of gravity of the planing hull.

3. The planing hull according to claim 1, wherein a downward angle of the pair of opposed water-deflecting surfaces varies along the lower longitudinal edge.

4. The planing hull according to claim 1, wherein a height of the pair of opposed water-deflecting surfaces varies along its length.

5. The planing hull according to claim 1, wherein the submerged bottom part extends from the outer boundary downwardly to a portion of the keel region forming a lowest point of the V-shaped bottom portion as seen in a cross section.

6. The planing hull according to claim 1, wherein a maximum height of the pair of opposed water-deflecting surfaces is less than or equal to 6% of a width of the planing hull.

* * * * *